United States Patent
Cheatham, III et al.

(10) Patent No.: US 8,969,848 B2
(45) Date of Patent: Mar. 3, 2015

(54) MATERIALS AND CONFIGURATIONS OF A FIELD EMISSION DEVICE

(71) Applicant: Elwha LLC, Bellevue, WA (US)

(72) Inventors: Jesse R. Cheatham, III, Seattle, WA (US); Philip Andrew Eckhoff, Kirkland, WA (US); William Gates, Medina, WA (US); Roderick A. Hyde, Redmond, WA (US); Muriel Y. Ishikawa, Livermore, CA (US); Jordin T. Kare, Seattle, WA (US); Nathan P. Myhrvold, Medina, WA (US); Tony S. Pan, Cambridge, MA (US); Robert C. Petroski, Seattle, WA (US); Clarence T. Tegreene, Mercer Island, WA (US); David B. Tuckerman, Lafayette, CA (US); Charles Whitmer, North Bend, WA (US); Lowell L. Wood, Jr., Bellevue, WA (US); Victoria Y. H. Wood, Livermore, CA (US)

(73) Assignee: Elwha LLC

( * ) Notice: Subject to any disclaimer, the term of this patent is extended or adjusted under 35 U.S.C. 154(b) by 0 days.

(21) Appl. No.: 14/177,796

(22) Filed: Feb. 11, 2014

(65) Prior Publication Data
US 2014/0159590 A1 Jun. 12, 2014

Related U.S. Application Data

(63) Continuation of application No. 13/587,762, filed on Aug. 16, 2012, now Pat. No. 8,692,226, which is a continuation-in-part of application No. 13/374,545, filed on Dec. 30, 2011, now Pat. No. 8,575,842.

(51) Int. Cl.
*H01L 29/06* (2006.01)
*H01L 21/00* (2006.01)

(52) U.S. Cl.
USPC .............................................. 257/10; 438/20

(58) Field of Classification Search
USPC .............. 438/20, 22; 315/108, 111.8; 257/10, 257/149–52
IPC .................................. H01L 29/02,33/00, 17/22
See application file for complete search history.

(56) References Cited

U.S. PATENT DOCUMENTS

| | | | |
|---|---|---|---|
| 2,404,919 | A | 7/1946 | Overbeck |
| 2,489,850 | A | 11/1949 | Baker |
| 2,744,960 | A | 5/1956 | Greefkes et al. |

(Continued)

FOREIGN PATENT DOCUMENTS

EP 1 063 197 A2 12/2000

OTHER PUBLICATIONS

Britnell et al.; "Electron Tunneling Through Ultrathin Boron Nitride Crystalline Barriers"; NANO Letters; bearing dates of Jan. 18, 2012, Feb. 14, 2012 and Mar. 1, 2012; pp. 1707-1710; vol. 12; American Chemical Society.

(Continued)

*Primary Examiner* — Calvin Lee

(57) ABSTRACT

A field emission device is configured as a heat engine. Different embodiments of the heat engine may have different configurations that may include a cathode, gate, suppressor, and anode arranged in different ways according to a particular embodiment. Different embodiments of the heat engine may also incorporate different materials in and/or proximate to the cathode, gate, suppressor, and anode.

22 Claims, 17 Drawing Sheets

(56) References Cited

U.S. PATENT DOCUMENTS

| | | | |
|---|---|---|---|
| 2,798,963 | A | 7/1957 | Saget |
| 4,274,035 | A | 6/1981 | Fukuhara et al. |
| 4,427,886 | A | 1/1984 | Martin et al. |
| 5,177,402 | A | 1/1993 | Howard et al. |
| 5,272,411 | A | 12/1993 | Francisco et al. |
| 5,371,371 | A | 12/1994 | Yamazaki et al. |
| 5,386,172 | A | 1/1995 | Komatsu |
| 5,548,138 | A | 8/1996 | Tanimoto et al. |
| 5,578,901 | A | 11/1996 | Blanchet-Fincher et al. |
| 5,606,215 | A | 2/1997 | Jaskie et al. |
| 5,631,524 | A | 5/1997 | Matsuzaki et al. |
| 5,717,279 | A | 2/1998 | Imura |
| 5,834,781 | A | 11/1998 | Fukuhara |
| 5,838,096 | A | 11/1998 | Shinada et al. |
| 5,850,120 | A | 12/1998 | Okamoto |
| 5,908,699 | A | 6/1999 | Kim |
| 5,936,348 | A | 8/1999 | Shimoi et al. |
| 5,936,354 | A | 8/1999 | Smith et al. |
| 5,942,834 | A | 8/1999 | Davis |
| 5,982,095 | A | 11/1999 | Jin et al. |
| 6,031,336 | A | 2/2000 | Rumbaugh et al. |
| 6,104,143 | A | 8/2000 | Bonavia |
| 6,205,790 | B1 | 3/2001 | Denkin et al. |
| 6,249,080 | B1 | 6/2001 | Komoda et al. |
| 6,313,587 | B1 | 11/2001 | MacLennan et al. |
| 6,373,175 | B1 | 4/2002 | Cade et al. |
| 6,404,089 | B1 | 6/2002 | Tomion |
| 6,538,367 | B1 | 3/2003 | Choi et al. |
| 6,590,320 | B1 | 7/2003 | Abanshin et al. |
| 6,632,113 | B1 | 10/2003 | Noma et al. |
| 6,949,887 | B2 | 9/2005 | Kirkpatrick et al. |
| 7,061,188 | B1 | 6/2006 | Katyl et al. |
| 7,157,849 | B2 | 1/2007 | Seon et al. |
| 7,462,979 | B2 | 12/2008 | Konishi et al. |
| 7,710,013 | B2 | 5/2010 | Tatsumi et al. |
| 7,741,764 | B1 | 6/2010 | Sung |
| 7,750,462 | B1 | 7/2010 | Cohn et al. |
| 7,825,591 | B2 | 11/2010 | Kimiya et al. |
| 7,903,789 | B2 | 3/2011 | Morton et al. |
| 8,018,169 | B2 | 9/2011 | Jeong et al. |
| 8,575,842 | B2 * | 11/2013 | Hyde et al. ............... 315/108 |
| 8,692,226 | B2 * | 4/2014 | Cheatham et al. ............ 257/10 |
| 8,810,131 | B2 * | 8/2014 | Cheatham et al. ............ 315/14 |
| 8,810,161 | B2 * | 8/2014 | Cheatham et al. ........... 315/325 |
| 2002/0036452 | A1 | 3/2002 | Muroyama et al. |
| 2003/0001490 | A1 | 1/2003 | Yamamoto et al. |
| 2003/0124944 | A1 | 7/2003 | Kyogaku et al. |
| 2003/0132393 | A1 | 7/2003 | Dimitrijevic et al. |
| 2004/0004588 | A1 | 1/2004 | Kawase et al. |
| 2004/0036402 | A1 | 2/2004 | Keesmann et al. |
| 2004/0050415 | A1 | 3/2004 | Kucherov et al. |
| 2004/0118347 | A1 | 6/2004 | Groves et al. |
| 2004/0226914 | A1 | 11/2004 | Dong et al. |
| 2004/0238809 | A1 | 12/2004 | Adamec et al. |
| 2005/0001598 | A1 | 1/2005 | Belokon et al. |
| 2005/0016575 | A1 | 1/2005 | Kumar et al. |
| 2005/0057168 | A1 | 3/2005 | Song et al. |
| 2005/0151461 | A1 | 7/2005 | Tuck et al. |
| 2006/0139207 | A1 | 6/2006 | Nikonov |
| 2006/0261724 | A1 | 11/2006 | DiCarlo |
| 2006/0273301 | A1 | 12/2006 | Moddel et al. |
| 2006/0284539 | A1 | 12/2006 | Sung |
| 2007/0023621 | A1 | 2/2007 | Blick et al. |
| 2007/0046163 | A1 | 3/2007 | Sata et al. |
| 2007/0158588 | A1 | 7/2007 | Zhou et al. |
| 2008/0001513 | A1 | 1/2008 | Chen et al. |
| 2008/0017237 | A1 | 1/2008 | Bray et al. |
| 2008/0100235 | A1 | 5/2008 | Lin et al. |
| 2009/0011706 | A1 | 1/2009 | Wilson et al. |
| 2009/0146583 | A1 | 6/2009 | Bhadri et al. |
| 2009/0194870 | A1 | 8/2009 | Nathanson et al. |
| 2009/0303654 | A1 | 12/2009 | Fan et al. |
| 2010/0019648 | A1 | 1/2010 | Yasuda et al. |
| 2010/0026160 | A1 | 2/2010 | Terui et al. |
| 2010/0090579 | A1 | 4/2010 | Sellmair |
| 2010/0102325 | A1 | 4/2010 | Kim et al. |
| 2010/0108882 | A1 | 5/2010 | Zewail |
| 2010/0271003 | A1 | 10/2010 | Jensen et al. |
| 2010/0295486 | A1 | 11/2010 | Ikehashi |
| 2010/0329964 | A1 | 12/2010 | Roos |
| 2011/0037400 | A1 | 2/2011 | Kim et al. |
| 2011/0088954 | A1 | 4/2011 | DiGiovanni et al. |
| 2011/0147761 | A1 | 6/2011 | Yu et al. |
| 2011/0186805 | A1 | 8/2011 | Bowers et al. |
| 2011/0201201 | A1 | 8/2011 | Arnold et al. |
| 2012/0041370 | A1 | 2/2012 | Moberg et al. |
| 2013/0168635 | A1 | 7/2013 | Cheatham, III et al. |
| 2013/0313980 | A1 * | 11/2013 | Cheatham et al. ............ 315/161 |

OTHER PUBLICATIONS

Brodie et al. "Vacuum Microelectronic Devices"; Proceedings of the IEEE; Jul. 1994; pp. 1006-1034; vol. 82, No. 7; IEEE.

Choi et al.; "A Simple Structure and Fabrication of Carbon-Nanotube Field Emission Display"; Applied Surface Science; bearing dates of Mar. 24, 2003 and Jul. 20, 2003; pp. 370-374; vol. 221; Elsevier B.V.

Chou et al.; "Sub-10 nm Imprint Lithography and Applications"; J. Vac. Sci. Technol. B; Nov./Dec. 1997; pp. 2897-2904; vol. 15, No. 6; American Vacuum Society.

Chung et al.; "Energy Exchange Processes in Electron Emission at High Fields and Temperatures"; J. Vac. Sci. Technol. B; Mar./Apr. 1994; pp. 727-736; vol. 12, No. 2; American Vacuum Society.

Dean et al.; "Current Saturation Mechanisms in Carbon Nanotube Field Emitters"; Applied Physics Letters; Jan. 17, 2000; pp. 375-377; vol. 76; No. 3; American Institute of Physics.

Desplat et al.; "Interaction of Cesium and Oxygen on W(110)"; Surface Science; 1980 (and bearing dates of Jun. 18, 1979 and Sep. 14, 1979); pp. 97-118; vol. 92; North-Holland Publishing Company.

Ding, Meng; "Field Emission from Silicon"; Paper submitted to the Department of Physics at Massachusetts Institute of Technology; Jun. 2001; 277 pp. total; Massachusetts Institute of Technology.

Fisher et al.; "Thermal and Electrical Energy Transport and Conversion in Nanoscale Electron Field Emission Processes"; Transactions of the ASME; Oct. 2002; pp. 954-962; vol. 124; ASME.

Fursey, George N.; Field Emission in Vacuum Microelectronics (1st Edition); Jan. 21, 2005; 205 pages; ISBN-10: 0306474506 and ISBN-13: 978-0306474507; Springer (entire book cited, but not provided).

Han et al.; "Vacuum Nanoelectronics: Back to the Future?—Gate Insulated Nanoscale Vacuum Channel Transistor"; Applied Physics Letters; bearing dates of Feb. 24, 2012, Apr. 22, 2012 and May 23, 2012; pp. 213505-1-213505-4; vol. 100; American Institute of Physics.

Himpsel et al.; "Quantum Photoyield of Diamond(111)—A Stable Negative-Affinity Emitter"; Physical Review B; Jul. 15, 1979; pp. 624-627; vol. 20; No. 2; The American Physical Society.

Hishinuma et al.; "Refrigeration by Combined Tunneling and Thermionic Emission in Vacuum: Use of Nanometer Scale Design"; Applied Physics Letters; Apr. 23, 2001; pp. 2572-2574; vol. 78; No. 17; American Institute of Physics.

Hu, Chenming; "Gate Oxide Scaling Limits and Projection"; International Electron Devices Meeting 1996, IEEE, pp. 319-322.

Humphrey et al.; "Power Optimization in Thermionic Devices"; J. Phys. D: Appl. Phys.; bearing dates of Nov. 11, 2004, Jun. 3, 2005 and 2005; pp. 2051-2054; vol. 38; IOP Publishing Ltd.

Humphrey et al.; "Reversible Quantum Brownian Heat Engines for Electrons"; Physical Review Letters; Sep. 9, 2002; pp. 116801-1-116801-4; vol. 89, No. 11; The American Physical Society.

Japanese Patent Office; Notice of Rejection; App. No. 2009-500523; Mar. 21, 2013 (received by our agent on Mar. 26, 2013); 6 total pages (3 pages with English Machine Translation).

Kusunoki et al.; "Highly Efficient and Long Life Metal-Insulator-Metal Cathodes"; J. Vac. Sci. Technol. B—Microelectronics and Nanometer Structures; Jul./Aug. 2012; pp. 041202-1-041202-8; vol. 30; No. 4; American Vacuum Society.

Lovicott, Dominick; "Electron Emission Thermal Energy Conversion"; Thesis presented to the Graduate School Faculty at the University of Missouri at Columbia; Jul. 2010; pp. 1-141 and 22 addit. pages which incl. title page, signature page, acknowledgements,

(56) References Cited

OTHER PUBLICATIONS abstract, table of contents, list of figures, list of tables, and nomenclature; University of Missouri—Columbia.
Mammana et al.; "Field Emission Device With Back Gated Structure"; J.Vac. Sci. Technol. A—Vacuum, Surfaces, and Films; Jul./Aug. 2004; pp. 1455-1460; vol. 22; No. 4; American Vacuum Society.
Marcus et al.; "Formation of Silicon Tips with <1 nm Radius"; Applied Physics Letters; Jan. 15, 1990; pp. 236-238; vol. 56; No. 3; American Institute of Physics.
Medvedev et al.; "Generation of Magnetic Fields in the Relativistic Shock of Gamma-Ray-Burst Sources"; The Astrophysical Journal; Dec. 1, 1999; pp. 697-706; vol. 526; The American Astronomical Society.
Milanovic et al.; "Micromachining Technology for Lateral Field Emission Devices"; IEEE Transactions on Electron Devices; Jan. 2001; pp. 166-173; vol. 48; No. 1; IEEE.
Mimura et al.; "Improvement of the Emission Current from a Cesiated Metal-Oxide-Semiconductor Cathode"; Applied Physics Letters; bearing dates of Oct. 6, 2005, Feb. 6, 2006 and Mar. 24, 2006; pp. 123514-1-123514-3; vol. 88; American Institute of Physics.
Mishra et al.; "Model of Work Function of Tungsten Cathodes with Barium Oxide Coating"; Journal of Applied Physics; Mar. 15, 2004; pp. 3069-3074; vol. 95, No. 6; American Institute of Physics.
Nakpathomkum et al.; "Thermoelectric Efficiency at Maximum Power in Low-Dimensional Systems"; Oct. 8, 2010; pp. 1-13.
Nasibulin et al.; "A Novel Hybrid Carbon Material;" Nature Nanotechnology; Mar. 2007; pp. 156-161; vol. 2; Nature Publishing Group.
O'Dwyer et al.; "Electronic Efficiency in Nanostructured Thermionic and Thermoelectric Devices"; Physical Review B; bearing dates of 2005, Jun. 15, 2005, Sep. 6, 2005 and Nov. 21, 2005; pp. 205330-1-205330-10; vol. 72; Issue 205330; The American Physical Society.
Ottens et al.; "Near-Field Radiative Heat Transfer Between Macroscopic Planar Surfaces"; Physical Review Letters; Jul. 1, 2011; pp. 014301-1-014301-4; vol. 107, Issue 014301; American Physical Society.
Pan et al.; "Field Emission Heat Engines"; printed on Dec. 28, 2011; 92 pp. total (incl. cover sheet, table of contents).
Pan et al.; "Field Emission Heat Engines II"; Intellectual Ventures internal white paper; created on May 15, 2012 and printed on Aug. 2, 2012; pp. 1-43.
PCT International Search Report; International App. No. PCT/US13/38249; Nov. 5, 2013; pp. 1-4.
PCT International Search Report; International App. No. PCT/US2013/038233; Oct. 4, 2013; pp. 1-5.
PCT International Search Report; International App. No. PCT/US2013/038254; Aug. 26, 2013; pp. 1-2.
PCT International Search Report; International App. No. PCT/US13/38476; Aug. 26, 2013; pp. 1-2.
PCT International Search Report; International App. No. PCT/US2012/071837; Mar. 11, 2013; pp. 1-3.
PCT International Search Report; Application No. PCT/US2012/071833; Mar. 8, 2013; pp. 1-3.
PCT International Search Report; International App. No. PCT/US2012/071845; Mar. 4, 2013; pp. 1-3.
PCT International Search Report; International App. No. PCT/US2012/071841; Mar. 1, 2013; pp. 1-2 (additional 4 pages of Search History).
PCT International Search Report; International App. No. PCT/US2012/071849; Feb. 27, 2013; pp. 1-3 (additional 3 pages of Search History).
Rasor, Ned S.; "Thermionic Energy Conversion Plasmas"; IEEE Transactions on Plasma Science; Dec. 1991; pp. 1191-1208; vol. 19, No. 6; IEEE.
Schwede et al.; "Photon-Enhanced Thermionic Emission for Solar Concentrator Systems"; Nature Materials; Sep. 2010; pp. 762-767; vol. 9.
Shakouri, Ali; "Nanoscale Devices for Solid State Refrigeration and Power Generation"; 20th IEEE Semi-Therm Symposium; bearing a date of 2004 and printed on Dec. 28, 2011; pp. 1-10; IEEE.
Shaw et al.; "Method and Structure for Local Emission Regulation and Arc Prevention in Field Emitter Arrays"; J.Vac. Sci. Technol. B; Mar./Apr. 2005; pp. 836-839; vol. 23; No. 2.
Spindt et al.; "Physical Properties of Thin-Film Field Emission Cathodes with Molybdenum Cones"; Journal of Applied Physics; Dec. 1976; pp. 5248-5263; vol. 47; No. 12; American Institute of Physics.
Tsu et al.; "Tunneling in a Finite Superlattice"; Appl. Phys. Lett.; Jun. 1, 1973; pp. 562-564; vol. 22, No. 11; American Institute of Physics.
Tuckerman et al.; High-Performance Heat Sinking for VLSI; IEEE Electron Device Letters; May 1981; pp. 126-129; vol. EDL-2, No. 5; IEEE.
Tuckerman et al.; "Microchannel Heat Transfer: Early History, Commercial Applications, and Emerging Opportunities"; Proceedings of the ASME 2011 9th International Conference on Nanochannels, Microchannels and Minichannels in Edmonton, Alberta, Canada; Jun. 19-22, 2011; pp. 1-18; ASME.
Vining, Cronin B.; "An Inconvenient Truth About Thermoelectrics"; Nature Materials; Feb. 2009; pp. 83-85; vol. 8; Macmillan Publishers Limited.
Westover, Tyler L.; "Energy Transport and Conversion in Electron Emission Processes"; A Dissertation submitted to the Faculty of Purdue University in West Lafayette, Indiana; Aug. 2008; pp. 1-238 plus addit. 20 pages incl. Dissertation Acceptance form, Research Integrity and Copyright Disclaimer form; title page, acknowledgements, table of contents, list of tables, list of figures, and abstract; ProQuest LLC, Ann Arbor, MI.
Yang et al.; "Monochromatic Electron Photoemission from Diamondoid Monolayers"; created on Aug. 2, 2012; 26 pages total (incl. Figs. & Supporting Online Material addendum of 8 pgs.).
Zhu et al.; "Large Current Density from Carbon Nanotube Field Emitters"; Applied Physics Letters; Aug. 9, 1999; pp. 873-875; vol. 75; No. 6; American Institute of Physics.
Zhu, Wei; Vacuum Microelectronics (1st Edition); Sep. 21, 2001; 396 pages; ISBN-10: 047132244X and ISBN-13: 978-04713224443; Wiley-Interscience (entire book cited, but not provided).

* cited by examiner

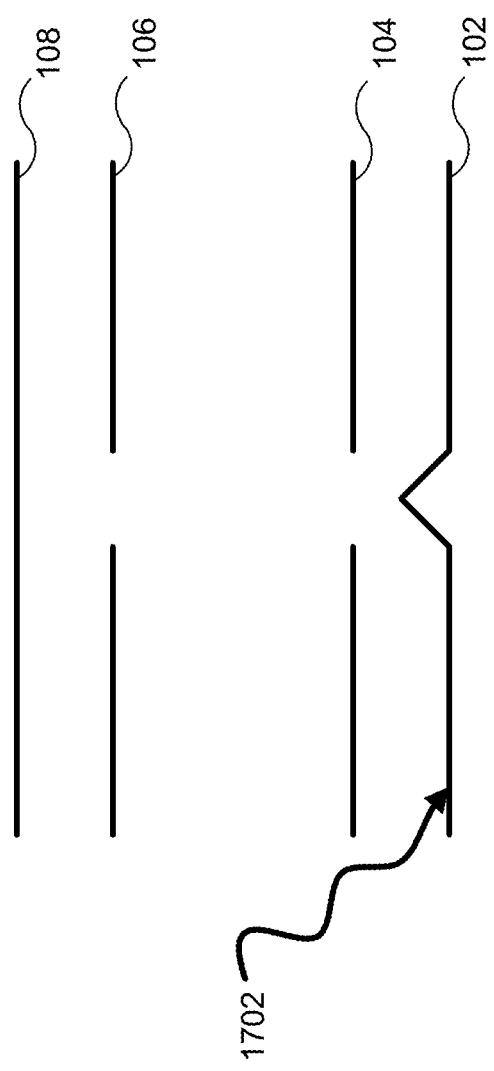

MATERIALS AND CONFIGURATIONS OF A FIELD EMISSION DEVICE

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

Priority Applications

The present application constitutes a continuous of U.S. patent application Ser. No. 13/587,762, entitled MATERIALS AND CONFIGURATIONS OF A FIELD EMISSION DEVICE, naming JESSE R. CHEATHAM, III, PHILIP ANDREW ECKHOFF, WILLIAM GATES, RODERICK A. HYDE, MURIEL Y. ISHIKAWA, JORDIN T. KARE, NATHAN P. MYHRVOLD, TONY S. PAN, ROBERT C. PETROSKI, CLARENCE T. TEGREENE, DAVID B. TUCKERMAN, CHARLES WHITMER, LOWELL L. WOOD, JR., and VICTORIA Y. H. WOOD, filed 16 Aug. 2012, which is currently co-pending or is an application of which a currently co-pending application is entitled to the benefit of the filing date, and which is a continuation-in-part of U.S. patent application Ser. No. 13/374,545, entitled FIELD EMISSION DEVICE, naming JESSE R. CHEATHAM, III, PHILIP ANDREW ECKHOFF, WILLIAM GATES, RODERICK A. HYDE, MURIEL Y. ISHIKAWA, JORDIN T. KARE, NATHAN P. MYHRVOLD, TONY S. PAN, ROBERT C. PETROSKI, CLARENCE T. TEGREENE, DAVID B. TUCKERMAN, CHARLES WHITMER, LOWELL L. WOOD, JR., and VICTORIA Y. H. WOOD as inventors, filed 30 Dec. 2011.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In one embodiment, an apparatus comprises: a cathode; an anode, wherein the anode and cathode are receptive to a first power source to produce an anode electric potential higher than a cathode electric potential; a gate positioned between the anode and the cathode, the gate being receptive to a second power source to produce a gate electric potential selected to induce electron emission from the cathode for a first set of electrons having energies above a first threshold energy; and a suppressor positioned between the gate and the anode, the suppressor being receptive to a third power source to produce a suppressor electric potential selected to induce electron emission from the anode.

In another embodiment, an apparatus comprises: a cathode having a spatially-varying slope; an anode having a spatially varying slope that is complementary to the cathode spatially-varying slope, wherein the anode and cathode are receptive to a first power source to produce an anode electric potential higher than a cathode electric potential; a gate positioned between the anode and the cathode, the gate being receptive to a second power source to produce a gate electric potential selected to induce electron emission from the cathode for a first set of electrons; and a suppressor positioned between the gate and the anode, the suppressor being receptive to a third power source to produce a suppressor electric potential selected to induce electron emission from the anode.

In another embodiment, an apparatus comprises: a cathode; an anode, wherein the anode and cathode are receptive to a first power source to produce an anode electric potential higher than a cathode electric potential, and wherein the anode includes a metal layer and a layer including a negative electron affinity material in contact with the metal layer; and a gate positioned between the anode and the cathode, the gate being receptive to a second power source to produce a gate electric potential selected to induce electron emission from the cathode for a first set of electrons having energies above a first threshold energy.

In another embodiment, an apparatus comprises: a cathode; an anode, wherein the anode and cathode are receptive to a first power source to produce an anode electric potential higher than a cathode electric potential, and wherein the anode includes a negative electron affinity material; and a gate positioned between the anode and the cathode, the gate being receptive to a second power source to produce a gate electric potential selected to induce electron emission from the cathode for a first set of electrons having energies above a first threshold energy.

In another embodiment, an apparatus comprises: a substrate; and a pattern on the substrate. The pattern forms: a cathode; an anode, wherein the anode and cathode are receptive to a first power source to produce an anode electric potential higher than a cathode electric potential; a gate receptive to a second power source to produce a gate electric potential selected to induce electron emission from the cathode for a first set of electrons having energies above a first threshold energy; and a suppressor receptive to a third power source to produce a suppressor electric potential selected to induce electron emission from the anode.

In another embodiment, an apparatus comprises: a first substrate having a first pattern; a second substrate having a second pattern. The first and second substrates are arranged such that the first and second patterns form: a cathode; an anode, wherein the anode and cathode are receptive to a first power source to produce an anode electric potential higher than a cathode electric potential; a gate receptive to a second power source to produce a gate electric potential selected to induce electron emission from the cathode for a first set of electrons having energies above a first threshold energy; and a suppressor receptive to a third power source to produce a suppressor electric potential selected to induce electron emission from the anode.

In another embodiment, an apparatus comprises: a cathode; an anode, wherein the anode and cathode are receptive to a first power source to produce an anode electric potential higher than a cathode electric potential; and a suppressor positioned proximate to the anode, the suppressor being receptive to a third power source to produce a suppressor electric potential selected to induce electron emission from the anode and to induce electron emission from the cathode, and configured to produce a net flow of electrons from the cathode to the anode.

In another embodiment, a method comprises: applying a first electric potential to selectively release a first set of electrons from a bound state in a first region; applying a second electric potential to selectively release a second set of electrons from emission from a bound state in a second region different from the first region, the second region having an anode electric potential that is greater than a cathode electric potential of the first region; and passing a portion of the first set of electrons through a gas-filled region and binding the passed portion of the first set of electrons in the second region.

In another embodiment, an apparatus comprises: a cathode; an anode, wherein the anode and cathode are receptive to a first power source to produce an anode electric potential higher than a cathode electric potential; a gate, the gate being receptive to a second power source to produce a gate electric potential selected to induce electron emission from the cathode for a first set of electrons having energies above a first threshold energy; and a suppressor, the suppressor being receptive to a third power source to produce a suppressor electric potential selected to induce electron emission from the anode.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 17 is a schematic of electromagnetic energy incident on a field emission device.

The use of the same symbols in different drawings typically indicates similar or identical items.

DETAILED DESCRIPTION

Figure 1:
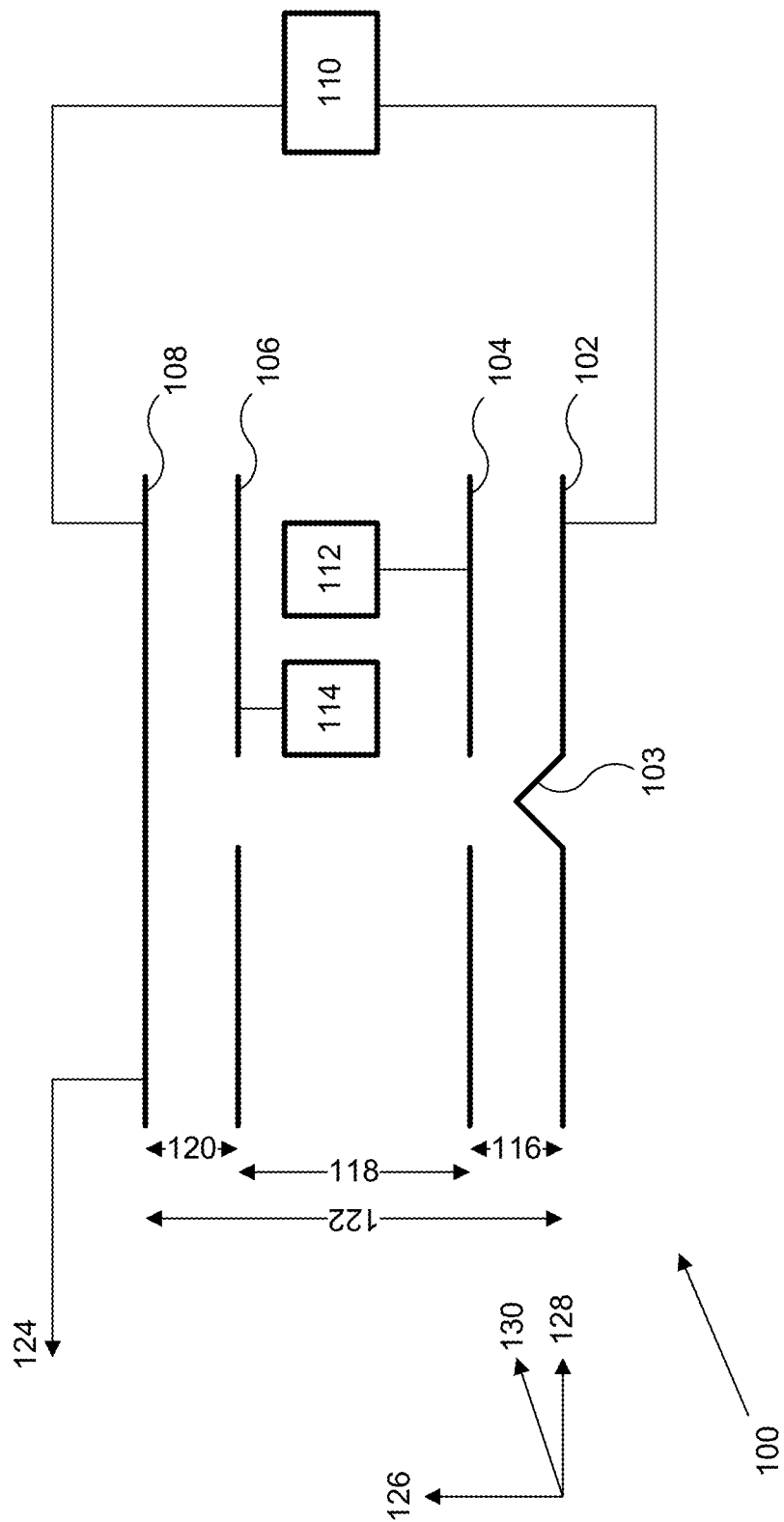
FIG. 1 is a schematic of an apparatus comprising a cathode, a gate, a suppressor and an anode.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 2:
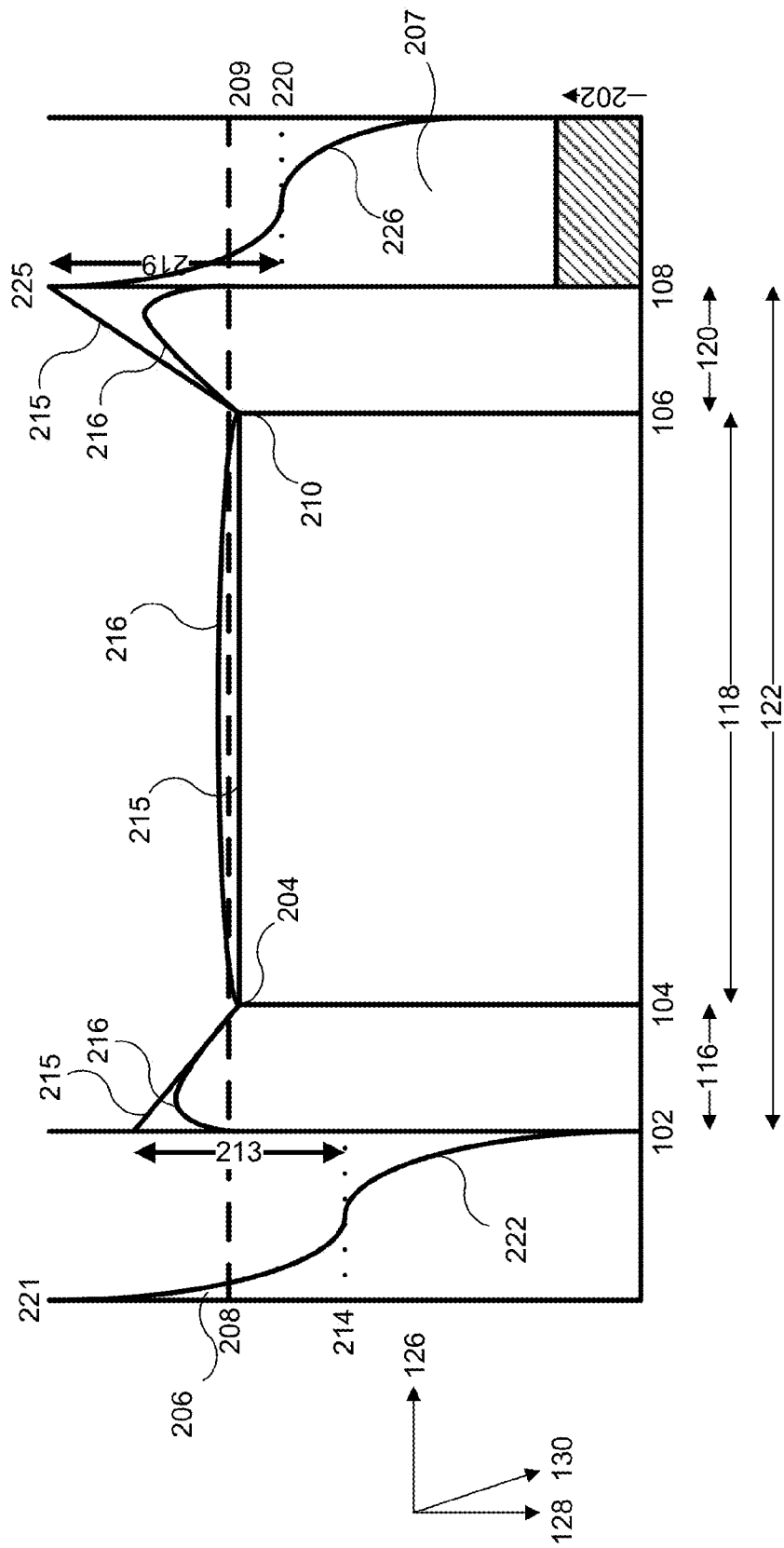
FIG. 2 is a schematic of energy levels corresponding to an embodiment of the apparatus of FIG. 1.
Figure 3:
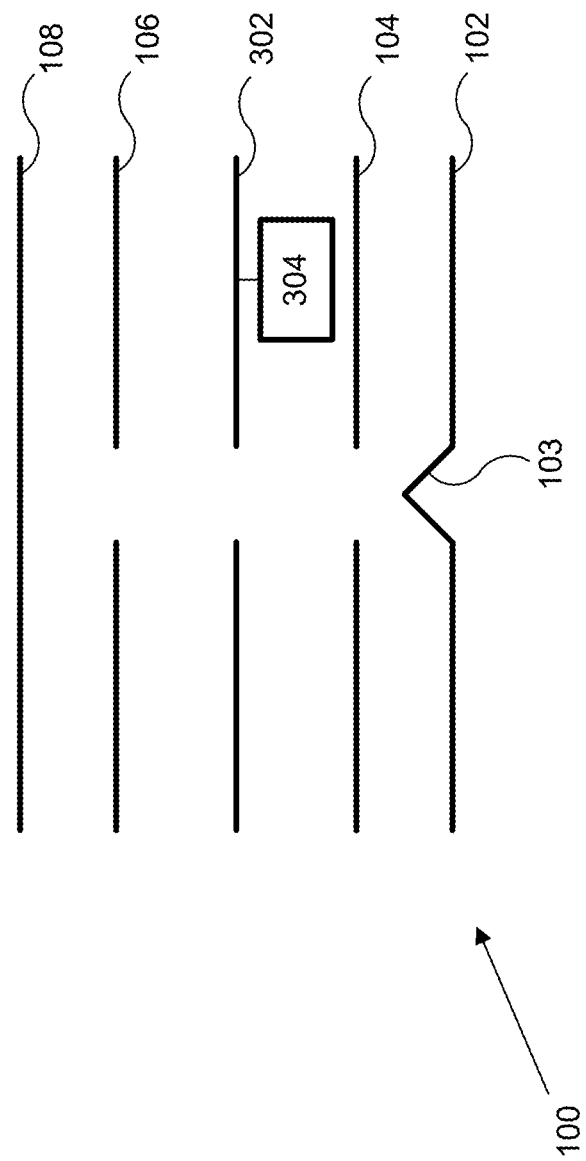
FIG. 3 is a schematic of an apparatus comprising a cathode, a gate, a suppressor, an anode, and a screen grid.

In one embodiment, shown in FIG. 1, an apparatus 100 comprises a cathode 102, an anode 108 arranged substantially parallel to the cathode 102, wherein the anode 108 and cathode 102 are receptive to a first power source 110 to produce an anode electric potential 202 higher than a cathode electric potential. It is the convention in this discussion to generally reference electric potentials relative to the value of the cathode electric potential, which in such circumstances can be treated as zero. The anode electric potential 202 and other electric potentials corresponding to the apparatus of FIG. 1 are shown in FIG. 2 for an embodiment of FIG. 1 corresponding to a heat engine. The apparatus 100 further comprises a gate 104 positioned between the anode 108 and the cathode 102, the gate 104 being receptive to a second power source 112 to produce a gate electric potential 204, wherein the gate electric potential 204 is selected to induce electron emission from the cathode 102 for a first set of electrons 206 having energies above a first threshold energy 208. The apparatus 100 further comprises a suppressor 106 positioned between the gate 104 and the anode 108, the suppressor 106 being receptive to a third power source 114 to produce a suppressor electric potential 210 selected to block electron emission from the anode 108 for a second set of electrons 207 having energies below a second threshold energy 209 while passing at least a portion of the first set of electrons 206. In this embodiment the anode 108 is positioned to receive the passed portion of the first set of electrons 206. In some embodiments the anode output 124 may be electrically connected to power a device.

Although conventionally a cathode is considered an electron emitter and an anode is an electron receiver, in the embodiments presented herein, the cathode and anode generally both emit and receive electrons. The net current and heat flow in the embodiments described herein may be determined by the temperatures of the cathode 102 and the anode 108, the anode electric potential 202, and the gate and suppressor electric potentials 204, 210. In some embodiments described herein, such as an electricity producing heat engine that moves heat from a higher temperature to a lower temperature, net electron flow and heat flow is from the cathode 102 to the anode 108, and in other embodiments described herein, such as an electricity consuming heat engine that moves heat from a lower temperature to a higher temperature, net electron flow and heat flow is from the anode 108 to the cathode 102. Further, in the embodiments presented herein, both the cathode 102 and the anode 108 are electron emitters, and either or both of the cathode 102 and/or the anode 108 may include field emission enhancement features 103.

FIG. 1 shows the cathode 102 having a field emission enhancement feature 103, however in some embodiments the cathode may be substantially flat and may not include the field emission enhancement feature 103. In some embodiments including one or more field emission enhancement features 103, the field emission enhancement features 103 may include a geometric tip and/or a carbon nanotube.

The apparatus 100 includes at least one region including gas through which at least a first portion of the first set of electrons 206 pass. Normally, the region between the cathode 102 and anode 108 is a gas-filled region (or, spacer region) through which at least a portion of the first set of electrons 206 passes. The gas may be comprised of at least one atomic or molecular species, partially ionized plasma, fully ionized plasma, or mixtures thereof. The gas composition and density may be chosen to be conducive to the passage of electrons. The gas density may be below atmospheric density, and may be sufficiently low as to be effectively a vacuum. This region may, in some embodiments, be air or its equivalent, wherein the pressure of the region may or may not be adjusted.

The resulting potential 215 as a function of distance from the cathode in the x-direction 126 in the apparatus 100 is shown in FIG. 2 for an embodiment of FIG. 1 corresponding to a heat engine. The potential 215 does not take into account the space charge electric potential due to the emitted electrons between the cathode and anode. It also does not take into account the image charge electric potential due to image charge effects of a flat plate (i.e., the cathode and anode). The net electric potential 216 experienced by the electrons between the cathode and anode is a function of all of the electric potentials acting on the electrons, including the space charge electric potential and the image charge electric potential. Further, electric potentials such as those shown in FIG. 2 are defined herein for negatively-charged electrons, instead of the Franklin-conventional positive test charges, such that electrons gain kinetic energy when moving from high to low potential.

In the above description and the remainder of the description, it is to be understood that electrons obey the laws of quantum mechanics and therefore, given a potential barrier such as that formed between the cathode and gate (i.e., the portion of the potential 216 that is between the cathode and gate), electrons having energies between the bottom and top of the potential barrier have some probability of tunneling through the barrier. For example, some electrons having energies above the threshold energy 208 may not be emitted from the cathode 102. Further, for the first set of electrons 206 that is emitted from the cathode, there is some probability, based on their energy and the suppressor electric potential 210, that they will tunnel through the potential barrier that is formed between the suppressor and the anode (i.e., the portion of the potential 216 that is between the suppressor and the anode).

Although the first, second and third power sources 110, 112 and 114 are shown in FIG. 1 as being different, in some embodiments the power sources 110, 112 and 114 may be included in the same unit. There are many different ways that the power sources 110, 112 and 114 may be configured relative to the elements 102, 104, 106 and 108, and one skilled in the art may determine the configuration depending on the application.

Also shown in FIG. 2, on the left and right sides of the graph of the potentials 215, 216, are graphs of the Fermi-Dirac distributions F(E, T) for the electrons in the cathode 102 and the anode 108.

On the left side is a graph of the Fermi-Dirac distribution corresponding to the cathode $F_c(E_c, T_c)$ (222) as a function of electron energy $E_c$ (221). Also shown is the cathode Fermi energy $\mu_c$ (214) and the cathode work function $\phi_c$ (213).

On the right side is a graph of the Fermi-Dirac distribution corresponding to the anode $F_a(E_a, T_a)$ (226) as a function of electron energy $E_a$ (225). Also shown is the anode Fermi energy $\mu_a$ (220) and the anode work function $\phi_a$ (219).

Electrons in a reservoir (e.g., the cathode 102 and anode 108) obey the Fermi-Dirac distribution:

$$F(E, T) = \frac{1}{1 + e^{(E-\mu)/kT}}$$

where $\mu$ is the Fermi energy, k is the Boltzmann constant, and T is the temperature. The energy where the Fermi occupation of the cathode $F_c(E_c, T_c)$ equals the Fermi occupation of the anode $F_a(E_a, T_a)$ is the Carnot-efficiency energy $E_{carnot}$:

$$E_{carnot} = \frac{\mu_a T_c - \mu_c T_a}{T_c - T_a}$$

where $\mu_c$ is the cathode Fermi energy 214 and $\mu_a$ is the anode Fermi energy 220 shown in FIG. 2, measured from the bottom of the conduction band of the cathode 102, and $T_c$ is the cathode temperature and $T_a$ is the anode temperature.

In cases where the cathode 102 and anode 108 are the same material, the Carnot-efficiency energy $E_{carnot}$ is the energy at which the Fermi occupation of the cathode 102 and the anode 108 are equal, and theoretically electron flow between the two occurs without change in entropy. Absent potential barrier 216, at any given electron energy above $E_{carnot}$ there are more electrons in the hotter plate, so the net flow of electrons at these energies go from hot plate to cold plate. Conversely, at any given electron energy below $E_{carnot}$ there are more electrons in the colder plate, so the net flow of electrons at these energies go from cold plate to hot plate.

In the embodiment of FIG. 1 corresponding to a heat engine, the cathode 102 is hotter than the anode 108 ($T_c > T_a$) and the anode 108 is biased above the cathode 102 as shown in FIG. 2. In this embodiment, $\mu_a = \mu_c + V_0$, where $V_0$ is the anode electric potential 202. Then the Carnot-efficiency energy is equal to:

$$E_{carnot} = \mu_c + \frac{V_0}{\eta_{carnot}}$$

where $$\eta_{carnot} = \frac{T_c - T_a}{T_c}$$

is the Carnot efficiency. Due to the potential bias $V_0$, every electron going from the cathode 102 to the anode 108 gains useful potential energy $V_0$ that can be used to do work, and every electron going from the anode 108 to the cathode 102 expends potential energy $V_0$ to transport heat instead.

Without potential barriers (such as the gate 104 and/or the suppressor 106), at any given electron energy below $E_{carnot}$ the net flow of electrons go from the anode 108 to the cathode 102, expending potential energy $V_0$ per electron to transport heat. Therefore, in an embodiment where the apparatus is an electricity-producing heat engine, the electrons from the anode having energies less than $E_{carnot}$ are blocked by the suppressor 106, reducing the loss of thermodynamic efficiency.

An electron at energy $E_{carnot}$ takes away $E_{carnot}$ from the hot cathode 102 upon emission, and is replaced by an electron with average energy $\mu_c$, so the net heat loss due to the emission of this electron at the hot plate is $V_0/\eta_{carnot}$. Thus, the ratio of useful-energy-gained to heat-loss is $\eta_{carnot}$, and we conclude that emitted electrons of energy $E_{carnot}$ are Carnot efficient, hence the name.

Because the first set of electrons 206 has momentum in the y- and z-directions (128, 130) as well as in the x-direction (126), in an embodiment in which electron flow from the cathode 102 below the Carnot-efficiency energy $E_{carnot}$ is blocked, the gate electric potential $E_g$ (204) is slightly below the Carnot-efficiency energy $E_{carnot}$:

$$E_g \approx E_{carnot} - kT_c$$

or, $$E_g \approx \frac{\mu_a T_c - \mu_c T_a}{T_c - T_a} - kT_c$$

where $kT_c$ represents the average energy of the electrons in the y- and z-directions (128, 130) combined. The suppressor electric potential $E_s$ (210) may be selected to be the same as the gate electric potential $E_g$ (204).

In some embodiments, the gate electric potential 204 and the suppressor electric potential 210 may have other values. For example, one or both of the gate and/or suppressor electric potentials 204, 210 may be lower than previously described. In one embodiment, the apparatus is configured such that the peak of the portion of the potential 216 that is between the cathode 102 and the gate 104 is around the Carnot-efficiency energy $E_{carnot}$, and/or the peak of the portion of the potential 216 that is between the suppressor 106 and the anode 108 is around the Carnot-efficiency energy $E_{carnot}$. In such an embodiment the efficiency of the apparatus may be different from previously described. These are just a few examples of potentials that may be applied to the gate 104 and/or the suppressor 106, and the actual potentials at the gate 104 and suppressor 106 may depend on the particular application and the selected energy ranges of electron emission to be screened from the cathode 102 and the anode 108. While in general, the sign of net electron-carried heat flow matches that of the net electron current flow, for some embodiments the different energy weighting of different portions of the electron distribution may result in opposite net flow of electron-carried heat and electron current.

The separations between the different elements 102, 104, 106 and 108 depend on the particular embodiment. For example, in some embodiments the apparatus 100 is a nanoscale device. In this embodiment, the cathode 102 and anode 108 may be separated by a distance 122 that is 10-1000 nm, the cathode 102 and gate 104 may be separated by a distance 116 that is 1-100 nm, and the anode 108 and the suppressor 106 may be separated by a distance 120 that is 1-100 nm. These ranges are exemplary embodiments and not meant to be limiting. In the case where the apparatus 100 is a nanoscale device, the lower limit of distances 116, 118, 120, and/or 122 may be at least partially determined by fabrication technology that is evolving. To illustrate existing technology for producing small separations, cathode-gate and suppressor-anode separations 116, 120 on the order of 1 nm may be achieved by depositing a nm scale dielectric layer on the cathode 102 and/or anode 108 and depositing the gate 104 and/or suppressor 106 on the dielectric layer. Further, in cases where the cathode 102 includes one or more field emission enhancement features 103, the cathode-gate separation 116 may be at least partially determined by the length of the feature 103 in the x-direction 126. For example, if the length of the feature 103 in the x-direction 126 was 5 nm, the cathode-gate separation 116 would be at least 5 nm.

In other embodiments the apparatus is larger than nanoscale, and exemplary separation distances 116, 118, 120, and/or 122 may range between the nanometer to millimeter scale. However, this scale is again exemplary and not limiting, and the length scales 116, 118, 120, 122 may be selected at least partially based on operating parameters of other gridded electron emitting devices such as vacuum tubes.

The cathode and anode work functions 213, 219 are determined by the material of the cathode 102 and anode 108 and may be selected to be as small as possible. The cathode and anode may comprise different materials. One or both materials can include metal and/or semiconductor, and the material(s) of the cathode 102 and/or anode 108 may have an asymmetric Fermi surface having a preferred Fermi surface orientation relative to the cathode or anode surface. An oriented asymmetric Fermi surface may be useful in increasing the fraction of electrons emitted normally to the surface and in decreasing the electron's transverse momentum and associated energy. In some embodiments, it is useful to reduce the electron current emitted from one of the surfaces (such as reducing anode emission current in an electricity producing heat engine, or reducing cathode emission current in an electricity consuming heat engine). This reduction may utilize an asymmetric Fermi surface which reduces momentum components normal to the surface. This reduction may involve minimization of the material's density of states (such as the bandgap of a semiconductor) at selected electron energies involved in the device operation.

Although the embodiments described with respect to FIG. 2 correspond to a heat engine, the device as shown in FIG. 1 may be configured, for example, as a heat pump or a refrigerator. In an embodiment where the apparatus of FIG. 1 is configured as a heat pump, the bias $V_0$ is applied to the cathode 102 instead of to the anode 108 as shown in FIG. 2. In an embodiment where the apparatus of FIG. 1 is configured as a refrigerator to cool the anode 108, the bias $V_0$ (202) is applied to the anode and the suppressor electric potential 210 and gate electric potential 204 may be chosen to be substantially below the Carnot-efficiency energy $E_{carnot}$. In this case, net current flow and heat transport is from the anode to the cathode.

In some embodiments the apparatus 100 further includes a screen grid 302 positioned between the gate 104 and the suppressor 106, the screen grid 302 being receptive to a fourth power source 304 to produce a screen grid electric potential. The screen grid electric potential can be chosen to vary the electric potential 216 between the gate 104 and the suppressor 106, and to accelerate electrons to another spatial region and thus reduce the effects of the space charge electric potential on the field emission regions of the cathode and/or anode.

Figure 4:
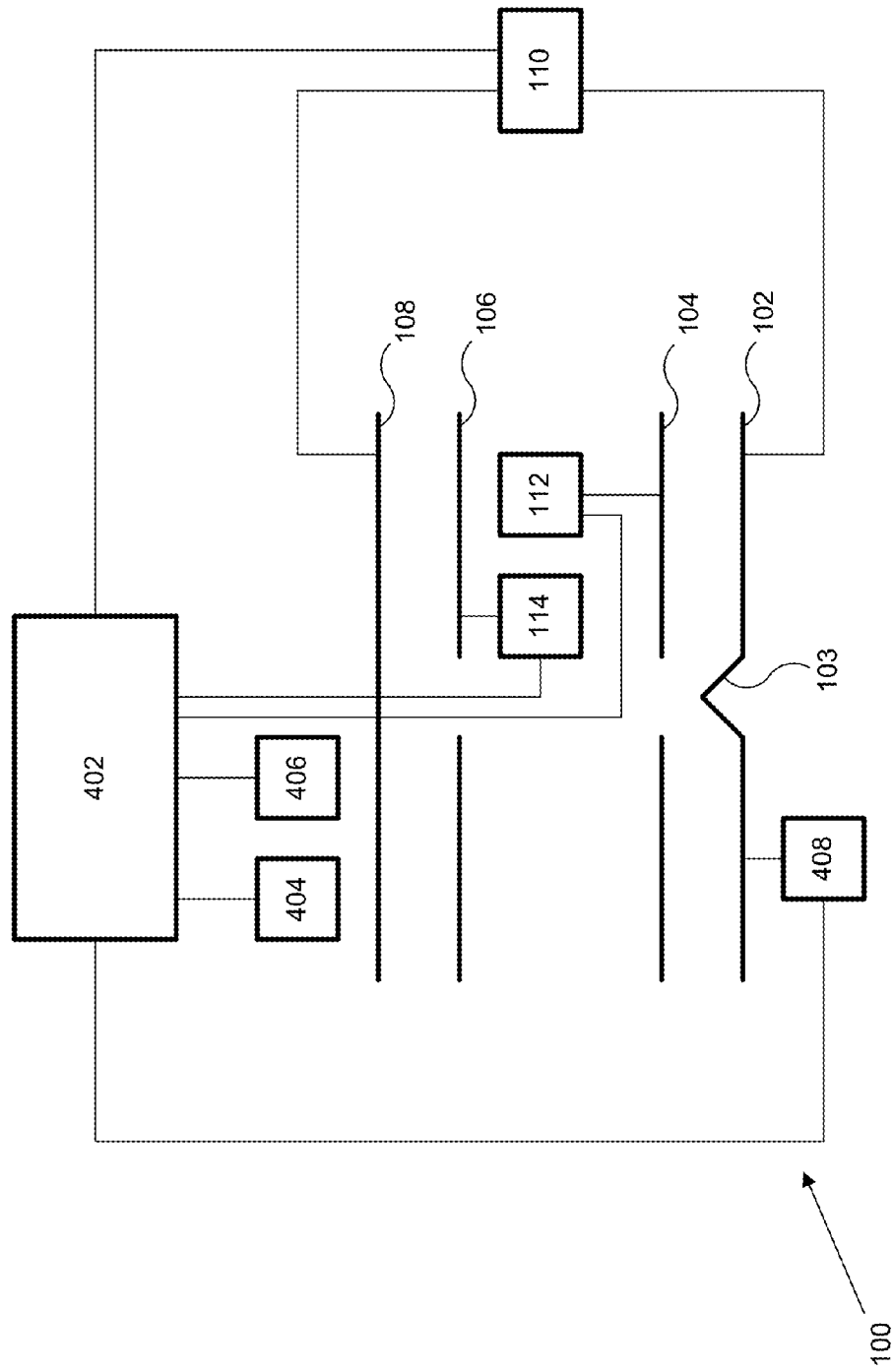
FIG. 4 is a schematic of an apparatus comprising a cathode, a gate, a suppressor, an anode, and circuitry.

In an embodiment shown in FIG. 4, the apparatus 100 further comprises circuitry 402 operably connected to at least one of the first, second and third power sources 110, 112 and 114 to vary at least one of the anode, gate and suppressor electric potentials 202, 204 and 210. The circuitry 402 may be receptive to signals to determine a relative power output and/or thermodynamic efficiency of the apparatus 100 and to dynamically vary at least one of the first, gate and suppressor electric potentials 202, 204, 210 responsive to the determined relative power output and/or thermodynamic efficiency. The apparatus 100 may further comprise a meter 404 configured to measure a current at the anode 108, and wherein the circuitry 402 is responsive to the measured current to vary at least one of the first, gate and suppressor electric potentials 202, 204 and 210. The apparatus 100 may further comprise a meter 406 configured to measure a temperature at the anode 108, and wherein the circuitry 402 is responsive to the measured temperature to vary at least one of the anode, gate and suppressor electric potentials 202, 204 and 210. The apparatus 100 may further comprise a meter 408 configured to measure a temperature at the cathode 102, and wherein the circuitry 402 is responsive to the measured temperature to vary at least one of the anode, gate and suppressor electric potentials 202, 204 and 210.

In some embodiments the circuitry 402 may be configured to iteratively determine optimal anode, gate, and suppressor electric potentials 202, 204, 210. For example, the circuitry 402 may be operably connected to the meter 404 configured to measure a current at the anode 108, and may iteratively change one of the anode, gate, and suppressor potentials to maximize the current at the anode.

Further, the circuitry 402 may be configured to iteratively determine optimal cathode 102 and anode 108 temperatures. For example, as described above relative to electric potentials, the circuitry 402 may be operably connected to the meter 404 configured to measure a current at the anode 108, and may iteratively change one of the cathode 102 and anode 108 temperatures to maximize the current at the anode 108.

In some embodiments the gate and suppressor electric potentials 204, 210 may be varied as a function of time. For example, the gate electric potential 204 may be switched on to release the first set of electrons 206 from the anode, and switched off once the first set of electrons 206 has passed through the gate 104. The suppressor electric potential 210 may be switched on to accelerate the first set of electrons 206 towards the anode 108, and switched off once the first set of electrons 206 has passed through the suppressor 106. Such an embodiment assumes high switching speeds. In some embodiments, switching such as that described above occurs cyclically and responsive to the circuitry 402.

Figure 5:
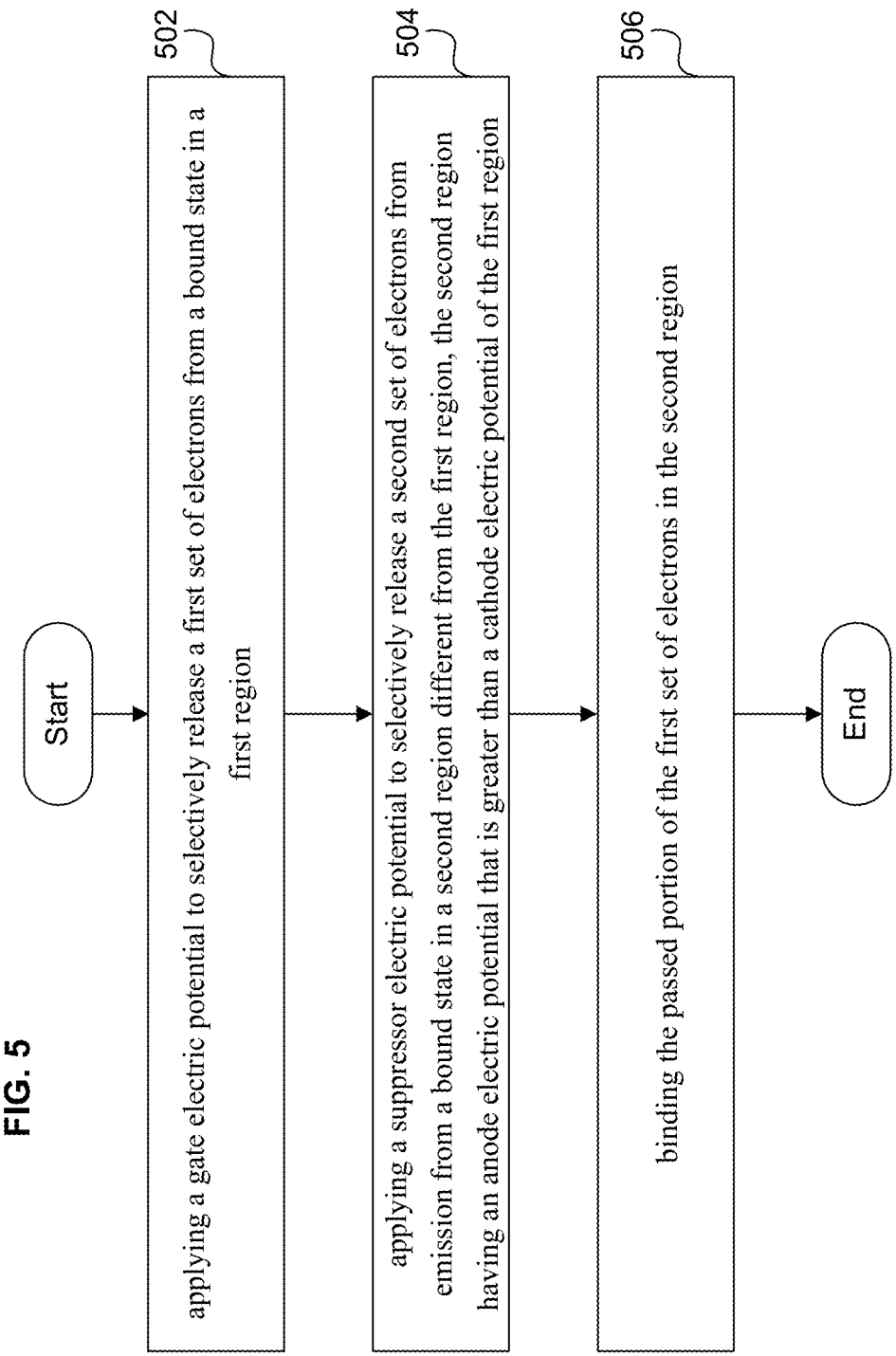
FIGS. 5-6 are flow charts depicting methods.

In one embodiment, depicted in the Flow Chart of FIG. 5, a method comprises: (502) applying a gate electric potential 204 to selectively release a first set of electrons 206 from a bound state in a first region (where in one embodiment the first region corresponds to the cathode 102); (504) applying a suppressor electric potential 210 to selectively release a second set of electrons from emission from a bound state in a second region different from the first region, the second region having an anode electric potential that is greater than a cathode electric potential of the first region (where in one embodiment the second region corresponds to the anode 108), the second region having an anode electric potential 202 that is greater than a cathode electric potential of the first region; and (506) passing a portion of the first set of electrons 206 through a gas-filled region and binding the passed portion of the first set of electrons 206 in the second region.

Various methods have been described herein with respect to FIGS. 1-4 and may apply to the methods depicted in the flow chart of FIG. 5. For example, methods related to the circuitry 402 and another apparatus shown in FIG. 4 apply to the method of FIG. 5, where the first region includes at least a portion of the cathode 102 and the second region includes at least a portion of the anode 108.

Figure 6:
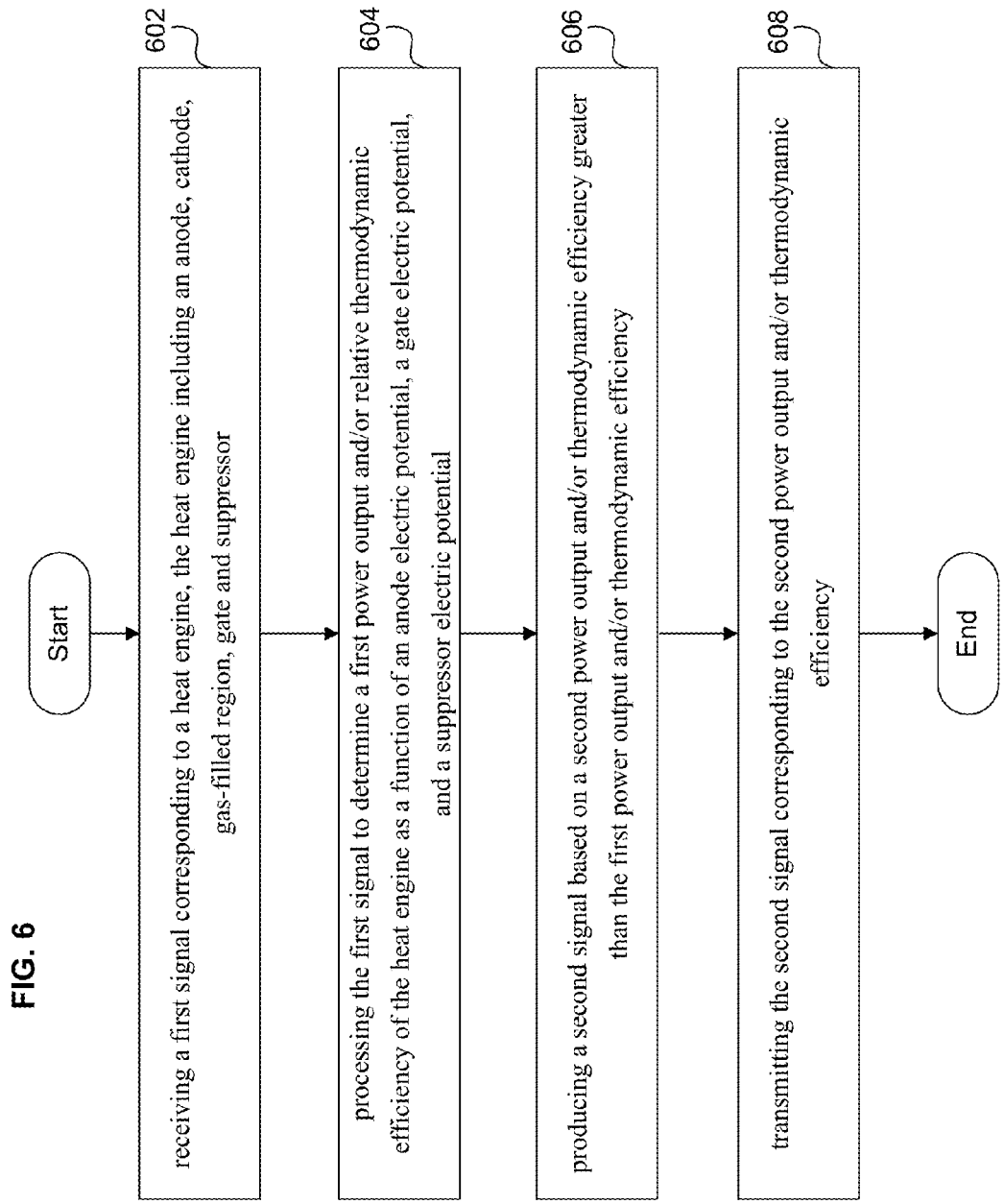

In one embodiment, depicted in the flow chart of FIG. 6, a method comprises (602) receiving a first signal corresponding to a heat engine, the heat engine including an anode, cathode, gas-filled region, gate and suppressor; (604) processing the first signal to determine a first power output and/or relative thermodynamic efficiency of the heat engine as a function of an anode electric potential, a gate electric potential, and a suppressor electric potential; (606) producing a second signal based on a second power output and/or thermodynamic efficiency greater than the first power output and/or thermodynamic efficiency; and (608) transmitting the second signal corresponding to the second power output and/or thermodynamic efficiency.

The method of FIG. 6 is applicable, for example, in an embodiment where a device as shown in FIG. 1 is received and the optimal parameters for a heat engine must be determined.

In one embodiment the first signal includes a user input including known dimensions, materials, and temperatures of the cathode and anode. In this embodiment, the known parameters may be used to calculate the optimal electric potentials applied to the anode 108, gate 104, and suppressor 106.

In another embodiment the first signal includes a measured parameter such as a current at the anode 108, where the electric potentials are varied to optimize the current at the anode. Such a scenario has been described with respect to the circuitry 402 shown in FIG. 4.

In one embodiment, producing the second signal may further include determining a change in at least one of the anode, gate and suppressor potentials, and the method may further comprise varying at least one of the anode, gate, and suppressor potentials in response to the determined change.

In another embodiment, producing the second signal may further include determining a change in at least one of a cathode and an anode temperature, and the method may further comprise varying at least one of the cathode and anode temperatures in response to the determined change.

In one embodiment, the anode, cathode, gate, and suppressor are separated by cathode-gate, gate-suppressor, and suppressor-anode separations, and producing the second signal may include determining a change in at least one of the cathode-gate, gate-suppressor, and suppressor-anode separations, and the method may further comprise varying at least one of the cathode-gate, gate-suppressor, and suppressor-anode separations in response to the determined change. For example, in some embodiments one or more of the cathode-gate, gate-suppressor, and suppressor-anode separations (116, 118, 120) may be variable (such as where one or more of the cathode 102, gate 104, suppressor 106, and anode 108 are mounted on a MEMS) and may be varied to optimize the efficiency of the device.

In one embodiment the received first signal corresponds to an anode current, and processing the first signal to determine a first relative thermodynamic efficiency of the heat engine as a function of an anode electric potential, a gate electric potential, and a suppressor electric potential includes determining the relative thermodynamic efficiency based on the anode current.

The "relative power output" and/or "relative thermodynamic efficiency" may be an actual power output and/or thermodynamic efficiency or it may be a quantity that is indicative of the power output and/or thermodynamic efficiency, such as the current at the anode. The relative power output and relative thermodynamic efficiency represent performance characteristics of the heat engine.

The following presents a calculation of the thermodynamic efficiency of a heat engine as described previously, and corresponding to the potentials of FIG. 2. Again, $T_c$ and $T_a$ are the temperatures of the cathode and anode, $\mu_c$ (214) and $\mu_a$ (220) are the Fermi levels of the cathode and anode (where, for simplicity, we take $\mu_c=0$, and $\mu_a=\mu_c+V_0=V_0$); and $\phi_a$ (213) and $\phi_a$ (219) are the work functions of the cathode and anode, where we assume that the cathode and anode are made from the same materials, so we set $\phi_c=\phi_a=\phi$.

In this one-dimensional model, the potential barrier (216) that is created between the cathode and anode only filters electrons with respect to their momentum in the x-direction (126), not with respect to their total momentum. Assuming ballistic, energy-conserving transport across the barrier (216), the current density J(W) as a function of energy W in the x-direction (126) is:

$$J(W)dW = eN(W)D(W)dW$$

Here, e is the electron charge. W is the electron energy associated with the component of momentum in the x-direction (126), which we will call the normal energy, and is defined by:

$$W = \frac{p_x^2}{2m} + V(x)$$

Where $p_x$ is the electron momentum in the x-direction (126), and V(x) is the net electric potential 216.

D(W) is the transmission function and represents the probability that an electron inside the emitter (for the heat engine, both the cathode and anode are emitters) with normal energy W either crosses over or tunnels through the energy barriers defined by the net electric potential (216).

The Wentzel-Kramers-Brillouin (WKB) approximation of the tunneling transmission coefficient is given by:

$$D(W) = e^{-\int_{x_1}^{x_2} \sqrt{\frac{8m}{\hbar^2}|V(x)-W|}\, dx}$$

Here, V(x) is the net electric potential (216), $x_1$ and $x_2$ are the roots of V(x)−W=0, m is the mass of an electron, and $\hbar$ is Planck's constant h divided by $2\pi$ ($\hbar = h/2\pi$).

The potential of a single field emission barrier (e.g., one of the peaks of the net electric potential (216) forms a single field emission barrier) is of the form:

$$V_{SB}(x) = \varphi - eFx - \frac{e^2}{4\pi\varepsilon_0}\frac{1}{4x}$$

Here, φ is the work function (again, here we choose the same material for the anode and cathode, so $\phi_c = \phi_a = \phi$), x is absolute value of the component of the distance from the emitter that is along the x-direction 216 (for the barrier between the cathode and gate, this is the distance from the cathode; for the barrier between the anode and suppressor, this is the distance from the anode), F is the effective electric field at the emitter (F=Bf$_i$, where β is the field enhancement factor due to the shape of the emitter and F$_i$ is the field without enhancement), and $\varepsilon_0$ is the permittivity of free space. The last term in the above equation for V$_{SB}$(x) is the potential due to image charge effects of a flat plate, which lowers the peak of the potential barrier. This is known as the Schottky effect, which can lower the barrier peak (i.e., the peak of the potential (216)) by as much as a few tenths of an eV for applied fields on the order of 1 V/nm. Note that in our system, we have two of these barriers, one between the cathode 102 and gate 104, and the other between the suppressor (106) and anode (108).

Including the image potential, the tunneling transmission coefficient D$_{SB}$(W) for a single rounded barrier (like one of the barriers formed by potential (216)) is given by:

$$D_{SB}(W) = e^{-\left(\frac{b(\varphi-W)^{3/2}}{F}\right)v(f)}$$

Where:

$$b = \frac{4\sqrt{2m}}{3\hbar e} \approx 6.830890 \text{ in eV}^{-3/2}(Vnm^{-1})$$

$$v(f) \approx 1 - f + \frac{1}{6}f\ln f$$

$$f = \frac{e^3}{4\pi\varepsilon_0}\frac{F}{(\varphi-W)^2} \approx 1.439964\frac{F}{(\varphi-W)^2} \text{ in eV}^2(nm/V)$$

The equation above for D$_{SB}$(W) for a single rounded barrier is only valid when the WKB approximation is valid, that is, when W is well below the peak of the barrier. Moreover, that equation gives nonsensical values for f>1, or equivalently, when:

$$W > \varphi - \sqrt{\frac{e^3 F}{4\pi\varepsilon_0}}$$

That is, when W exceeds the peak of the barrier. For electrons that have sufficient energy to pass over the barrier, classically, it might seem reasonable to take the transmission coefficient to be unity. Therefore, we can use:

$$D_{SB}(W) \approx e^{-b\frac{(\varphi-W)^{3/2}}{F}v(f)} \quad \text{for } f < 1$$

$$D_{SB}(W) \approx 1 \quad \text{for } f \geq 1$$

This is not exact, since for electrons with energies above a barrier's peak there is still a non-zero probability for the approaching electron wave to be reflected back from it. However, the above expression for D$_{SB}$(W) provides a good approximation. More accurate values for D$_{SB}$(W) can be found using numerical methods such as the transfer matrix method, and/or using more accurate models of the potential barrier that takes into account the geometry of the emitter.

N(W)dW is the electron supply function and describes the number of electrons incident on the emitter surface per second per unit area with normal energy inside the interval defined by W and W+dW. For a metal, this is:

$$N(W)dW = \frac{4\pi mkT}{h^3}\log\left[1 + e^{-\frac{(W-\mu)}{kT}}\right]dW$$

(For semiconductors and other materials, the supply function can be calculated from their band structures and density of states.)

Denoting the supply function of the hot cathode and cold anode as N$^c$ and N$^a$, the differential net current density from the cathode to the anode is:

$$J_{net}(W)dW = e[N^c(W) - N^a(W)]D(W)dW$$

Here, D(W) is the tunneling transmission coefficient that takes into account both barriers formed by the net electric potential 216. Denoting the barrier between the cathode and gate as D$_{SBc}$(W) and the barrier between the anode and suppressor as D$_{SBa}$(W), and taking reflections into account, D(W) is given by:

$$D(W) = \frac{D_{SBc}(W)D_{SBa}(W)}{D_{SBc}(W) + D_{SBa}(W) - D_{SBc}(W)D_{SBa}(W)}$$

Not including reflections, D(W) is approximately:

$$D(W) \approx D_{SBc}(W)D_{SBa}(W)$$

The total net current density J would then be:

$$J_{net} = \int J_{net}(W)dW$$

And the power (the terms "power" and "power output" are used interchangeably herein) is:

$$P = J_{net}V_0$$

The above calculations do not take into account the space charge potential built by the electrons traversing between the cathode and anode. Below is an example method for estimating this space charge potential and its effects.

If the gate (104) and suppressor (106) are set at the same potential bias $V_{grid}$, it is reasonable to assume that the electrons are uniformly distributed in the cathode-anode gap, with constant space charge density ρ. In this case, the space charge potential will be shaped like a parabola (and therefore, the portion of (216) between the gate (104) and the suppressor (106) will be a parabola), with its peak in the middle of the gap between the cathode (102) and anode (202), and a peak height $\Delta W_{sc}$ that is offset from $V_{grid}$ by:

$$\Delta W_{sc} = \frac{e\rho}{2\varepsilon_0}\frac{d^2}{4}$$

Here d is the distance between the cathode and anode. Electrons with energies lower than this peak will find the space charge potential difficult to travel through. Therefore, we approximate the effect of the space charges as an additional, uniform potential barrier, equal to the peak height of the space charge potential. The total barrier height $W_B$ will then be:

$$W_B = V_{grid} + \Delta W_{sc} = V_{grid} + \frac{e\rho}{2\varepsilon_0}\frac{d^2}{4}$$

Electrons with energies below $W_B$ are assumed to have a transmission probability of zero:

$$D(W) \approx D_{SBc}(W)D_{SBa}(W)\theta(W - W_B)$$

Here θ(W) is the Heaviside step function.
$W_B$ is a function of ρ, but the charge density ρ(W) as a function of the normal energy W depends on the sum of the cathode-emitted and anode-emitted current:

$$\rho(W)dW = \frac{J_{sum}(W)dW}{\sqrt{\frac{2}{m}(W - W_B)}}$$

Here the summed current is:

$$J_{sum}(W)dW = e[N^c(W) + N^a(W)]D(W)dW$$

Hence, the summed current depends on the transmission probability D(W), which itself is dependent on $W_B$. Therefore, we can solve for these quantities self-consistently using iterative numerical methods. For example, we can find ρ by solving for ρ in this equation:

$$\rho = \int_{V_{grid}+\frac{e\rho}{2\varepsilon_0}\frac{d^2}{4}}^{\infty} \frac{J_{sum}(W)dW}{\sqrt{\frac{2}{m}\left(W - V_{grid} - \frac{e\rho}{2\varepsilon_0}\frac{d^2}{4}\right)}}$$

We can then determine the total barrier height $W_B$, including the contribution of the space charge potential, and calculate its influence on the current, power, and thermodynamic efficiency of the device.

The exiting heat flux density $\dot{Q}$ due to the transfer of electrons at the cathode and anode may be approximated by:

$$\dot{Q}^c = \int_0^\infty[(W+kT_a-\mu_c)N^a(W) - (W+kT_c-\mu_c)N^c(W)]D(W)dW$$

$$\dot{Q}^a = \int_0^\infty[(W+kT_c-\mu_a)N^c(W) - (W+kT_a-\mu_a)N^a(W)]D(W)dW$$

Here, W+kT is the total energy of the emitted electron, including the kinetic energy in all directions, and we assume that the replacement electron comes in at the Fermi energy μ. For an electricity-generating heat engine, the cathode (102) should be losing heat energy while the anode should be receiving some heat, hence $\dot{Q}^c > 0$ and $\dot{Q}^a < 0$.

The thermodynamic efficiency η is the ratio between work gained to heat used, or, equivalently, the ratio of the useful power gained ($J_{net}V_0$) to the total heat flux density expended ($|\dot{Q}^c| + \dot{Q}_{other}$):

$$\eta = \frac{J_{net}V_0}{|\dot{Q}^c| + \dot{Q}_{other}}$$

$\dot{Q}_{other}$ is all heat loss other than $\dot{Q}^c$. For the heat engine having a cathode-anode separation distance 122 (d), $\dot{Q}_{other}$ can be mainly due to the heat transfer between the cathode (102) and anode (108) via evanescent waves ($W_{evanescent}$). This can be approximated by:

$$\dot{Q}_{other} \approx W_{evanescent} \approx 4 \times 10^{-12}\left(\frac{1}{d^2}\right)$$

in Watt/nm²/K, for d<1000 nm.
We can include other forms of heat transfer, for example heat conduction, in $\dot{Q}_{other}$ if needed.

Figure 7:
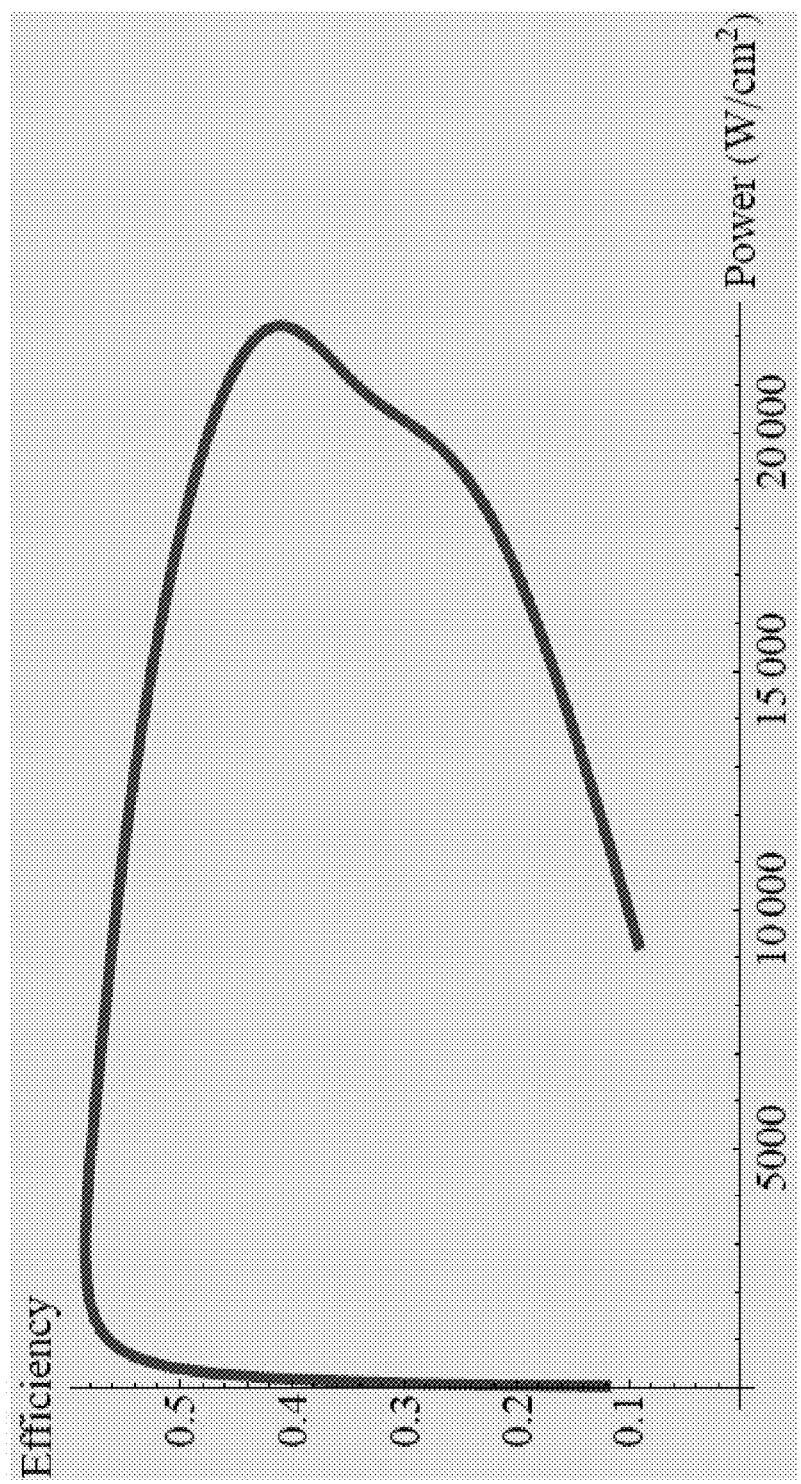
FIGS. 7-8 are graphs of thermodynamic efficiency versus power for a heat engine.

Using the equations provided herein for power (P) and thermodynamic efficiency (η), these parameters are graphed as a function of varying anode electric potential 202 in FIG. 7.

FIG. 7 corresponds to a cathode (102) and an anode (108) having field emission enhancement features (103), such that β>1. For FIG. 7, the cathode temperature $T_c$=1000 K, the anode temperature $T_a$=300 K, the work functions of the cathode and anode φ=2.1 eV, the cathode-anode separation (122) is 50 nm, the cathode-gate separation (116) and the suppressor-anode separation 120 are both 5 nm, and the field enhancement factors β=5 for each of the cathode (102) and anode (108), and the gate and suppressor electric potentials 204, 210 are set to $E_{carnot} - kT_c$.

FIG. 7 shows how the thermodynamic efficiency and power of a heat engine are related. By graphing this relationship the tradeoffs between thermodynamic efficiency and power are illustrated. The applied anode bias may be selected to maximize the thermodynamic efficiency, or it may be selected to maximize the power, or the anode electric potential 202 may be selected to correspond to some other point on the graph, such as between the maximum thermodynamic efficiency and the maximum power.

There are a number of embodiments for which a graph such as FIG. 7 (or simply the corresponding data) may be created. For example, in an embodiment where the heat engine device has fixed dimensions, such as where the device has already been created, a user may want to select the applied voltage $V_0$ based on a maximum thermodynamic efficiency, power, or optimal but not necessarily maximized values for each.

Further, although FIG. 7 shows results of varying the anode potential $V_0$ of the heat engine, there are a number of other parameters of the device on which the thermodynamic efficiency and power output depend. These include, but are not limited to, the cathode temperature $T_c$, the anode temperature $T_a$, the cathode and anode work functions $\phi_c$ and $\phi_a$, the gate and suppressor electric potentials 204, 210, the cathode-gate separation 116, suppressor-anode separation 120, and cathode-anode separation 122, and field enhancement factors of the cathode 102 and anode 108.

In different embodiments some of these values may be fixed and other may be variable. For example, in some embodiments the temperature of the cathode 102 and/or anode 108 may be determined by the operating conditions of the device such as ambient temperature and/or a temperature of the heat source that provides heat to the cathode. Further, these values may change in time. Therefore, in embodiments where the operating conditions determine the values of one or more parameters of the heat engine, other values may be selected to optimize the performance of the heat engine for the given parameters.

Further, in some embodiments more than one parameter may be optimized. For example, the anode electric potential 202 may be selected according to optimal values of thermodynamic efficiency and power as shown in FIG. 7, and the thermodynamic efficiency and power calculated as a function of varying gate and suppressor electric potentials 204, 210.

Figure 8:
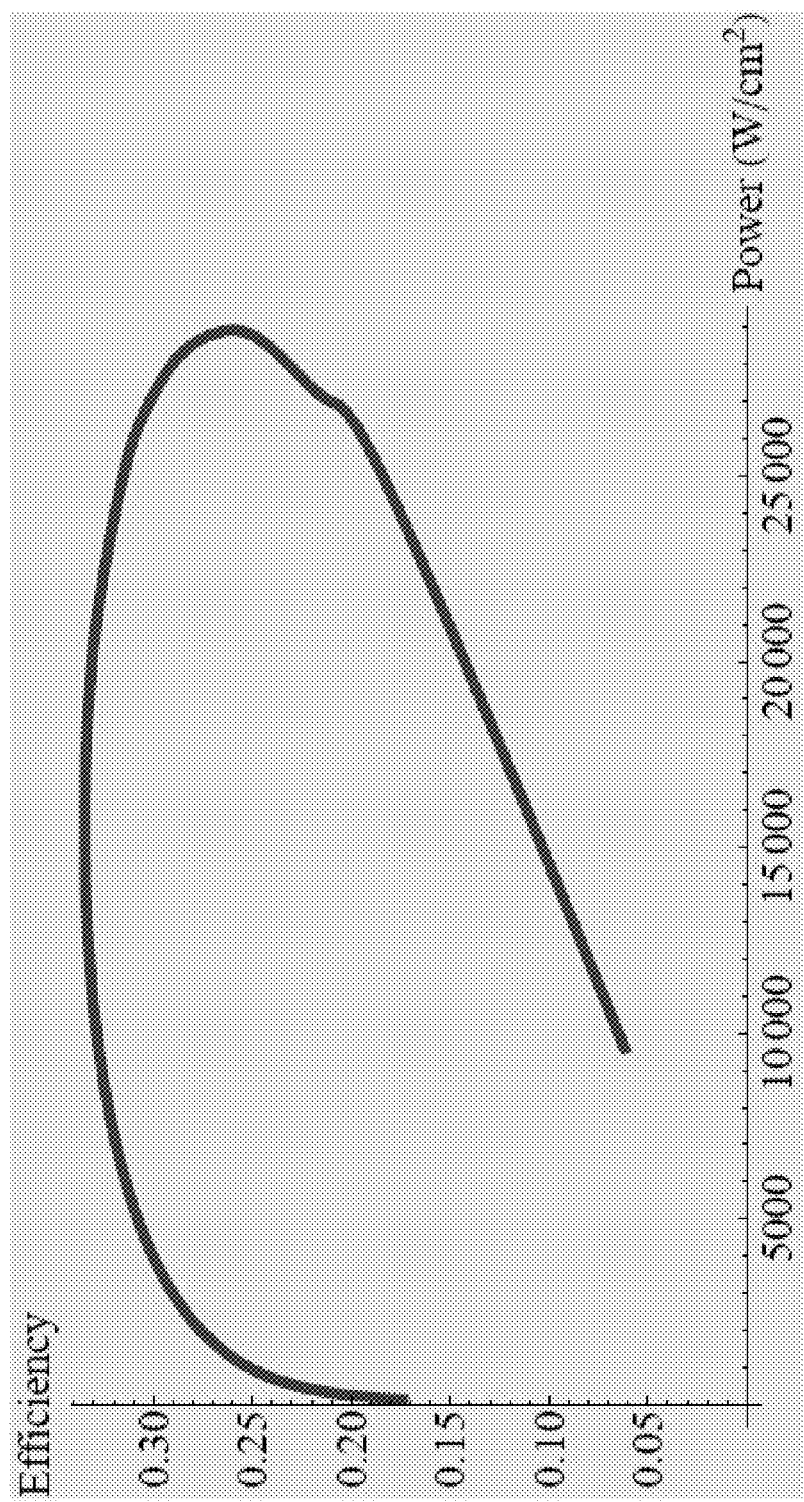

FIG. 8 shows the thermodynamic efficiency plotted versus power for varying gate and suppressor electric potentials 204, 210. FIG. 8 corresponds to a cathode (102) and an anode (108) having no field emission enhancement features (103), such that $\beta=1$. For FIG. 8, the cathode temperature $T_c=1000$ K, the anode temperature $T_a=300$ K, the work functions of the cathode and anode $\phi=2.1$ eV, the cathode-anode separation (122) is 50 nm, the cathode-gate separation (116) and the suppressor-anode separation 120 are both 2 nm, and the anode electric potential 202 is $4k(T_c-T_a)$.

In one embodiment a method of optimizing the performance of a heat engine comprises: determining substantially fixed parameters of the heat engine, the substantially fixed parameters including at least one of a cathode-gate separation, a suppressor-anode separation, and a cathode-anode separation; calculating a first relative thermodynamic efficiency and/or a first relative power output of the heat engine as a function of the substantially fixed parameters and as a function of a first set of values for variable parameters of the heat engine, the variable parameters including a cathode temperature, an anode temperature, an anode electric potential, a gate electric potential, and a suppressor electric potential; calculating a second relative thermodynamic efficiency and/or a second relative power output of the heat engine as a function of the substantially fixed parameter and as a function of a second set of values for the variable parameters, wherein at least one variable parameter has a different value in the first and second sets of values; and setting the at least one variable parameter according to the calculated first and second relative thermodynamic efficiencies and/or according to the calculated first and second relative power outputs.

A method of the embodiment as described above may be employed when, for example, a device including a heat engine is received and the device has been manufactured with a substantially fixed cathode-gate separation (116), suppressor-anode separation (120), and/or cathode-anode separation (122). Or, in some embodiments, the device may not yet have been manufactured but some parameters of the device may be fixed for other reasons. Determining the substantially fixed parameters may include measuring the parameters, receiving the parameters (wherein the parameters may be, for example, listed on the device, provided in a computer program, or provided in a different way), or determining the fixed parameters in a different way. Further, the substantially fixed parameters may include a cathode and/or anode field enhancement factor (or, more generally, a cathode and/or anode geometry). The substantially fixed parameters may further include the cathode work function (213), anode work function (219), cathode and anode band structures, and/or cathode and anode emissivities. Although parameters that may be substantially fixed have been listed above, in some embodiments there may be only one substantially fixed parameter, or there may be more or different substantially fixed parameters. Which parameters are substantially fixed and which ones are variable may depend on the particular embodiment.

For one or more substantially fixed parameters of the heat engine, the relative power output and/or the relative thermodynamic efficiency may be calculated for one or more variable parameters, and the one or more variable parameters may be selected according to a chosen value for the relative power output and/or relative thermodynamic efficiency. For calculations of relative thermodynamic efficiency and/or relative power output for more than one variable parameter, the variable parameters may be varied individually or simultaneously for each calculation.

Figure 9:
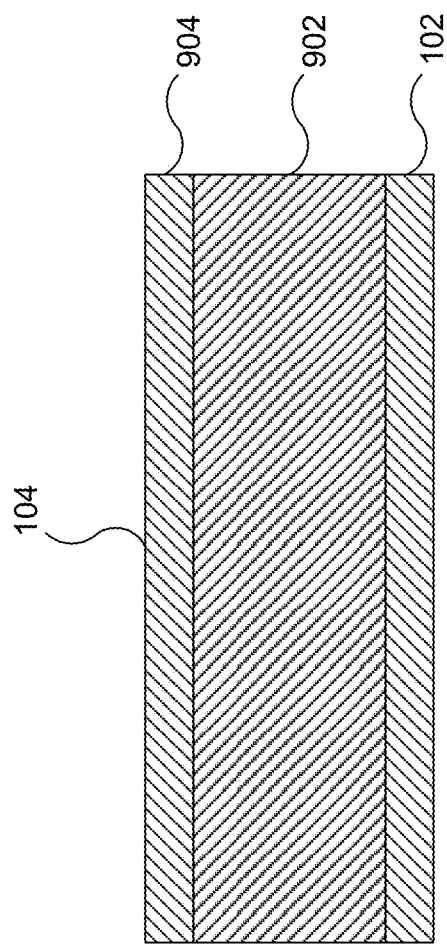
FIG. 9 is a schematic of a portion of a field emission device including a thin film.

In some embodiments, the gate (104) and/or the suppressor (106) may include a thin film (904), as shown in FIG. 9 (FIG. 9 shows an embodiment with a cathode (102), dielectric (902), and thin film (904) that forms the gate (104), however a similar embodiment includes an anode (108), dielectric (902), and thin film (904) that forms the suppressor (106)), where the thin film (904) may be metal and/or graphene, and where graphene may be a single layer or a bilayer film. The graphene may, in some embodiments, include a graphene allotrope, doped graphene, and/or functionalized graphene. The thin film (904) may be fabricated by depositing the dielectric (902) on the cathode (102) and/or anode (108), then depositing the thin film (904) of metal or graphene that forms the gate (104) and/or suppressor (106). In some embodiments, the dielectric (902) can be at least partially etched away, or in other embodiments it may be left in place. Thin film grids as described above that may be used for the gate (104) and/or suppressor (106) have been used for cathodes, such as in metal-insulator-metal tunneling cathodes, and also in metal-oxide-semiconductor cathodes. These emitters include a metal or semiconductor base electrode, an insulator, and a thin top electrode serving as the gate/suppressor. Although FIG. 9 shows a single thin film (904) that forms the gate (104), in some embodiments two or more thin films such as the film (904) may form the gate.

In an embodiment including a dielectric (902) proximate to the cathode (102) and/or anode (108), the gate (104) and/or suppressor (106) may be a thin film as described with respect to FIG. 9, or the gate (104) and/or the suppressor (106) may have a different configuration. The dielectric (902) may be used to support the gate (104) and/or suppressor (106), and/or it may serve to maintain the separation between the cathode (102) and gate (104) and/or the separation between the anode (108) and suppressor (106). In some embodiments, the dielectric (902) may be silicon oxide (SiO$_2$), boron nitride, diamond, and/or a self-healing dielectric, e.g., glassy rather than crystalline materials.

In different embodiments, at least one of the cathode (102) and anode (108) includes at least one of: tungsten, thoriated tungsten, an oxide-coated refractory metal, a boride, lanthanum hexaboride, molybdenum, tantalum, and hafnium.

In particular, in an embodiment where the cathode (102) is heated, the cathode (102) may include thoriated tungsten, which has a work function of approximately 2.5 eV. When heated, the lower-work-function thorium in the material migrates to the surface. In another embodiment of a heated cathode (102), the cathode (102) includes an oxide-coated refractory metal, which has a work function of approximately 2 eV. In yet another embodiment of a heated cathode (102), the cathode (102) includes a boride having a work function of approximately 2.5 eV. In particular, borides such as lanthanum hexaboride are amenable to physical vapor deposition techniques, and the cathode may be relatively easily coated with these materials.

In an embodiment of a heat engine where the cathode (102) is heated, but at a relatively low temperature (e.g., scavenging waste heat), a material with a relatively low work function, such as diamond-like carbon (DLC), may be incorporated as a coating for the cathode (102). In some embodiments the DLC may be doped with nitrogen. DLC is amenable to low temperature deposition techniques, and may be directly coated on Spindt tips, for example.

In some embodiments at least one of the cathode (102) and anode (108) includes diamond, and, in particular, may be coated with diamond. A diamond coating can be deposited from a methane atmosphere. Pure diamond has a relatively high work function, however diamond can be doped (with, for example, hydrogen) to have a low work function, and may be especially useful at relatively low operating temperatures. Hydrogen-terminated diamond surfaces have been found to exhibit negative electron affinity (NEA). To further increase field emission with diamond coatings, the diamond may be selected to have small grain sizes, or nano-crystalline diamond may be used. To take full advantage of the NEA of diamond at relatively low applied fields, the diamond may be n-type doped to place its Fermi level close to the conduction band. Further, since pure diamond can withstand electric field stresses up to about 1-2 V/nm before dielectric breakdown commences, it may be used as the dielectric to support the gate (104) and/or suppressor (106) relative to the anode (102) and/or the cathode (108).

In some embodiments, the cathode (102) and/or the anode (108) may include one or more carbon nanotubes that serve as field emission enhancement feature(s) (103). There may be a single nanotube serving as a single field emission enhancement feature (103) or multiple nanotubes serving as multiple field emission enhancement features (103) depending on the particular embodiment. For embodiments including multiple nanotubes (sometimes called nanotube forests), individual nanotubes may be selectively ablated to control emission. In some embodiments one or more carbon nanobuds may serve as one or more field emission enhancement feature(s) (103).

In some embodiments the cathode (102) and/or the anode may include a semiconductor, which may include silicon. In some embodiments the semiconductor may be doped. Specifically, doping the semiconductor may change its density of states, and so a semiconductor may be doped according to a selected density of states. A semiconductor cathode (102) and/or anode (108) may further be coated in order to vary the electron affinity and/or the work function, and/or to optimize the performance and/or the stability of the heat engine. The semiconductor may further be doped to vary the electron affinity, in some cases producing negative electron affinity (NEA) material.

Figure 10:
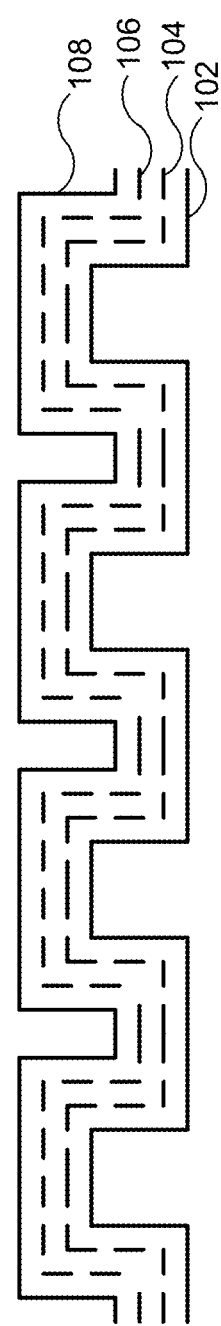
FIG. 10 is a schematic of a field emission device having a cathode and anode that form a substantially interlocking structure.

In some embodiments the cathode (102) and anode (108) may form a substantially interlocking structure ("interlocking combs"), as shown in FIG. 10. In FIG. 10 the gate (104) and the suppressor (106) are shown as being substantially continuous, however in some embodiments they may be discontinuous. Further, the spacings in the gate (104) and suppressor (106) shown in FIG. 10 are largely symbolic, and may be oriented differently according to a particular embodiment. Notably, the comb structure of the cathode (102) and anode (108) are relatively large in comparison with the size of a field emission enhancement structure (103), and an embodiment that employs such a comb structure may also include one or more field emission enhancement structures (103), although these are not shown in FIG. 10. The structure of FIG. 10 shows a cathode (102) having a spatially-varying slope, and an anode (108) also having a spatially varying slope that is complementary to the spatially-varying slope of the cathode (102). The spatially-varying slopes of the cathode (102) and anode (108) shown in FIG. 10 are substantially periodic, however in other embodiments they may be a-periodic and/or quasi-periodic. In some embodiments the slope of the cathode (102) and/or the slope of the anode (108) may be more smoothly varying that what is shown in FIG. 10. As shown in FIG. 10, the cathode-anode separation (122) varies slightly, however this separation is minimized. In some embodiments the cathode-anode separation (122) is substantially constant. In other embodiments, the cathode-anode separation (122) may have greater spatial variations, or in the case where the cathode (102) and anode (108) are substantially sinusoidal, the cathode-anode separation (122) may be configured with very little spatial variation.

Figure 11:
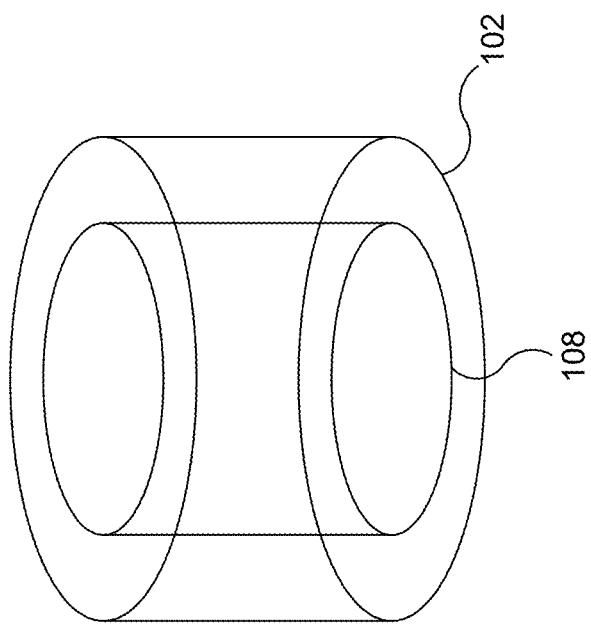
FIG. 11 is a schematic of a field emission device having a substantially tubular cathode and anode.

In one embodiment, shown in FIG. 11, the cathode (102) and anode (108) are substantially tubular, wherein at least a portion of the anode (108) is substantially circumscribed by at least a portion of the cathode (102). In this embodiment electrons flow radially from the cathode (102) to the anode (108), and vice-versa. Although the cathode (102) and anode (108) are shown as being substantially cylindrical in FIG. 11, in some embodiments there may be deviations from the cylindrical structure (i.e., they may be dented, their cross-sections may be an n-gon such as a hexagon or octagon, or they may form a different type of substantially co-axial structure). In some embodiments, cathode (102) may form the inner structure and the anode (108) may form the outer structure. Further, in some embodiments a coolant or heating structure may be placed inside the inner structure (for example, where the anode (108) forms the inner structure of a heat engine, a coolant may be configured to flow through or proximate to the anode (108), or where the cathode (102) forms the inner structure of a heat engine, a heating mechanism such as a heated fluid may be configured to flow through or proximate the cathode (102)). In some embodiments the gap between the cylinders as shown in FIG. 11 may change as a function of the temperature of the cylinders. Although the gate (104) and suppressor (106) are not shown in FIG. 11 for clarity, in most embodiments of a heat engine at least one grid would be included.

Figure 12:
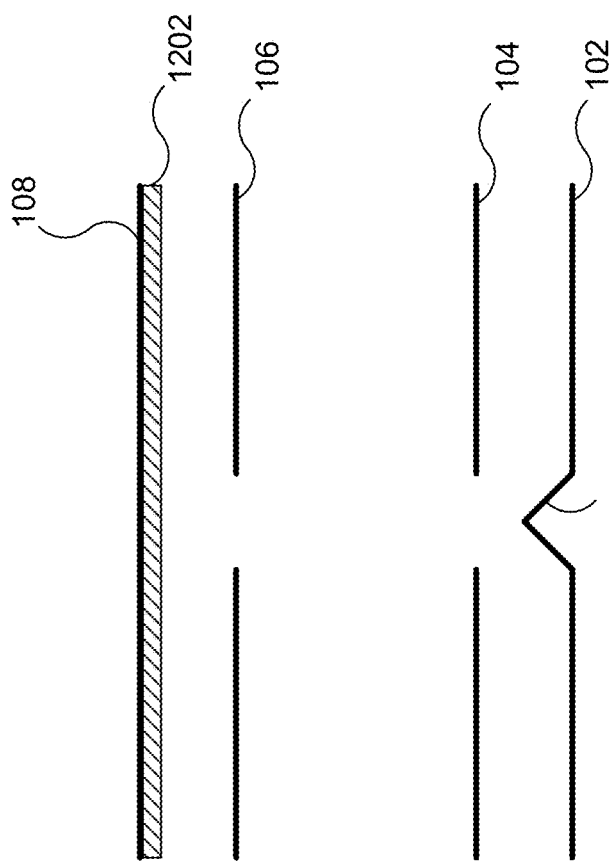
FIG. 12 is a schematic of a field emission device, wherein the anode includes a thin coating.

In an embodiment shown in FIG. 12 a thin dielectric coating (1202) is included on the anode (108). The thin dielectric coating may, in some embodiments, include a negative electron affinity (NEA) material such as hydrogen terminated diamond, which may be deposited on a metal that forms the anode (108). Such an embodiment may lower the effective work function of the metal that forms the anode (108). This embodiment may or may not include the suppressor (106).

In one embodiment the NEA material forms the anode (108), and in this embodiment the suppressor (106) may not be included and the device may still function as a heat engine. In this embodiment the NEA material may be chosen or doped such that its electron quasi-Fermi level is close to the conduction band.

In some embodiments, one or more of the gate (104) and suppressor (106) (and/or other grids that may be incorporated in the design) may be at least partially coated with one or more insulating materials.

In one embodiment all or part of the apparatus may be fabricated, e.g. via lithography, on a substrate. For example, in one embodiment the cathode (102), gate (104), suppressor (106), and the anode (108) are formed via lithography on a substrate such that they are all substantially one-dimensional and coplanar.

Figure 13:
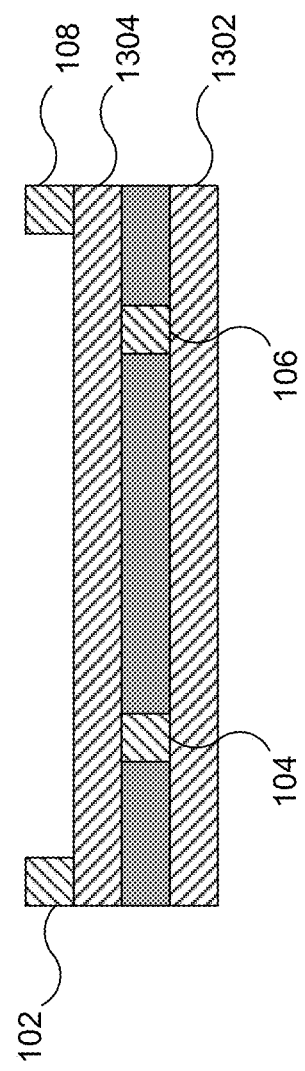
FIG. 13 is a schematic of a field emission device having a gate and suppressor that are fabricated on a first substrate, and having a cathode and anode that are fabricated on a second substrate.

In another embodiment, a cross-section of which is shown in FIG. 13, the gate (104) and the suppressor (106) are fabricated on a first substrate (1302) and the cathode (102) and anode (108) are fabricated on a second substrate (1304), wherein the first and second substrates (1302, 1304) are then positioned such that together the elements (1302, 1304, 1306, 1308) form the field emission device. In this embodiment the gate (104) and the suppressor (106) are effectively insulated from the cathode (102) and the anode (108) by the second substrate (1304). There are many other embodiments that are similar to this that may be implemented. For example, different elements such as (1302, 1304, 1306, 1308) may each be fabricated on their own substrate. Further, additional layers of insulators or other materials may be incorporated according to the particular embodiment. Further, more or fewer elements such as (1302, 1304, 1306, 1308) may be incorporated in the designs. There are many permutations that may be designed that incorporate the idea of fabricating elements on a substrate and combining the substrates to form a field emission device.

Figure 14:
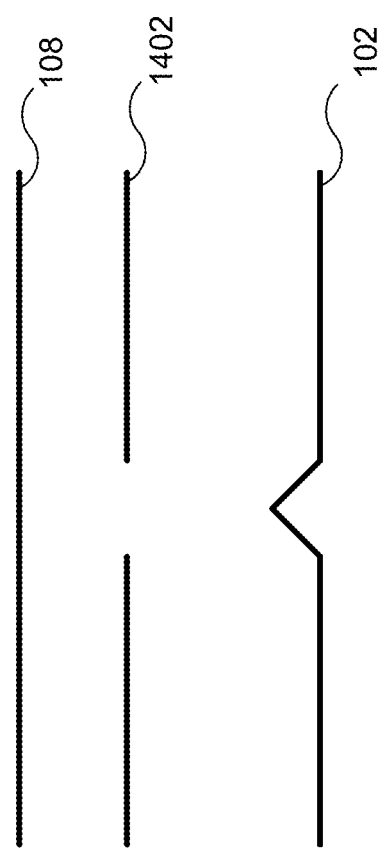
FIG. 14 is a schematic of a field emission device having a cathode, anode, and a gate/suppressor.
Figure 15:
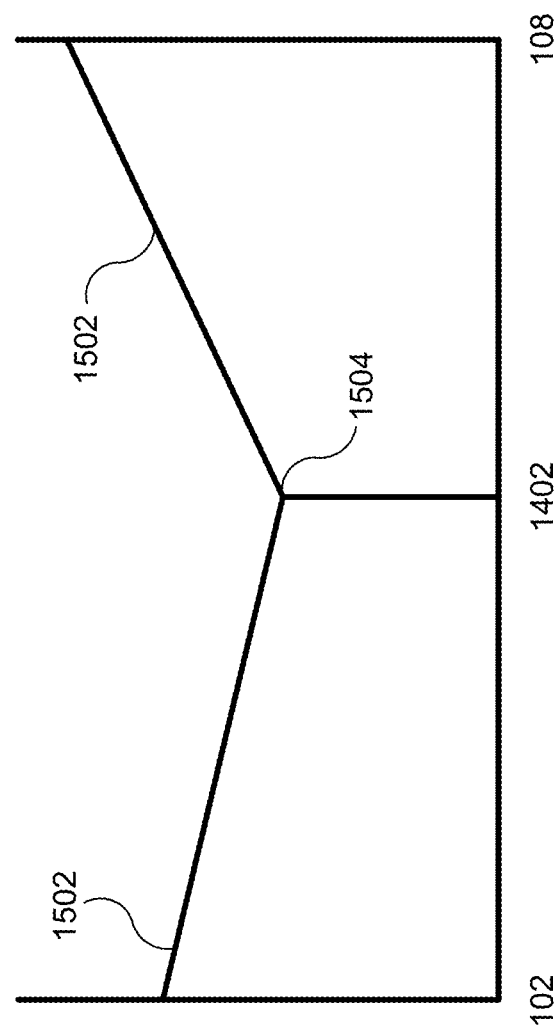
FIG. 15 is a schematic of the potential corresponding to the schematic of FIG. 14.

In some embodiments the gate (104) and the suppressor (106) may be created with a single grid, as shown in FIG. 14. The resulting potential (1502) as a function of distance from the cathode in the x-direction 126 is shown in FIG. 15 for the embodiment shown in FIG. 14. This embodiment is similar to that of FIG. 1, but having a single grid (the gate/suppressor 1402) that replaces the gate (104) and the suppressor (106). In this embodiment, the gate/suppressor (1402) is placed close enough to the anode (108) to be able to induce electron emission from the anode (108). Further, it can also be sufficiently close to the cathode (102) to induce electron emission from the cathode (102), and has a gate/suppressor electric potential (1504) that is selected to produce a net flow of electrons from the cathode (102) to the anode (108). There are a number of ways of constructing the apparatus of FIG. 14. In one embodiment, a gated field-emitter array such as a Spindt array is fabricated to produce the cathode (102) and the gate/suppressor (1402), and an anode (108) is arranged proximate to the gate/suppressor (1402). In another embodiment, the gate/suppressor (1402) is supported on and proximate to the anode (108), and there is no additional grid structure supported on the cathode (102), although the cathode (102) may still have field-enhancement structures.

Figure 16:
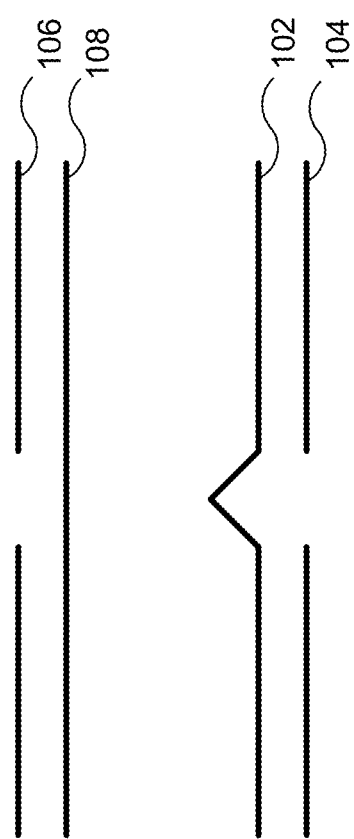
FIG. 16 is a schematic of a back-gated field emission device.

In some embodiments the field emission device is back-gated, as shown in FIG. 16. In FIG. 16, the gate (104) and the suppressor (106) are not positioned between the cathode (102) and anode (108), rather, the cathode (102) and anode (108) are positioned between the gate (104) and suppressor (106). Although the configuration of FIG. 16 is different in this way from the configuration of FIG. 1, they both may be configured as heat engines, such that electrons are emitted from both the cathode (102) and anode (108) and produce a net flow of electrons from the cathode (102) to the anode (108). The embodiment of FIG. 16 may include a dielectric layer between the gate (104) and cathode (102), and or between the anode (108) and suppressor (106). In such an embodiment, the dielectric (an example of a dielectric included between elements is shown in FIG. 9) may be continuous or discontinuous. Further, the apparatus as shown in FIG. 16 may be configured to reduce or remove accumulations of charge that may occur, for example, as a result of a dielectric layer. As described previously with respect to other embodiments described herein, there may be more or fewer elements than shown in FIG. 16. Further, the order of the elements may be different than what is shown in FIG. 16. For example, FIG. 16 shows the order being gate (104), cathode (102), anode (108), suppressor (106). However, in other embodiments the order may be gate (104), cathode (102), suppressor (106), anode (108). Or, the elements may be in a different order.

In some embodiments, emission from the cathode (102) may be enhanced electromagnetically, as shown in FIG. 17. FIG. 17 is shown with the configuration of FIG. 1 as an example, however any of the embodiments described herein may include enhanced cathode emission via electromagnetic energy. FIG. 17 shows electromagnetic energy (1702) incident on the cathode (102). This electromagnetic energy (1702) may be used to increase the number of electrons emitted, the rate of electrons emitted, and/or the energy of the emitted electrons from the cathode (102), which may therefore increase the power density of the device. In some embodiments the properties of the cathode (102) such as the cathode thickness, the cathode materials such as dopants, may be selected such that the photo-excited electrons tend to be emitted from the cathode (102) before they thermalize, or after they thermalize in the conduction band. FIG. 17 shows the electromagnetic energy (1702) hitting the cathode (102) at a single location, however in different embodiments the electromagnetic energy (1702) may impinge on a greater area of the cathode (102). The source of the electromagnetic energy (1702) includes, but is not limited to, solar and/or ambient electromagnetic energy, radiation from a local heat source, one or more lasers, and/or a different source of electromagnetic energy. There are many sources of electromagnetic energy that may be used in an embodiment such as that shown in FIG. 17 and one skilled in the art may select the source according to the particular embodiment. The properties of the electromagnetic energy (1702) such as the frequency, polarization, propagation direction, intensity, and other properties may be selected according to a particular embodiment, and in some embodiments may be selected to enhance the performance of the device. Further, optical elements such as lenses, photonic crystals, mirrors, or other elements may be incorporated in an embodiment such as that shown in FIG. 17, for example, to adjust the properties of the electromagnetic energy. In some embodiments the emission from the cathode (102) may be enhanced sufficiently such that the position and/or electric potentials applied to the gate (104) and/or suppressor (106) may be adjusted according.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
    a cathode;
    an anode, wherein the anode and cathode are receptive to a first power source to produce an anode electric potential higher than a cathode electric potential; and
    a suppressor positioned proximate to the anode, the suppressor being receptive to a third power source to produce a suppressor electric potential selected to induce electron emission from the anode and to induce electron emission from the cathode, and configured to produce a net flow of electrons from the cathode to the anode.

2. The apparatus of claim 1 wherein the anode and suppressor are separated by a separation distance that is between 1 and 10 nm.

3. The apparatus of claim 1 wherein the anode and suppressor are separated by a separation distance that is between 10 and 20 nm.

4. The apparatus of claim 1 wherein the anode and suppressor are separated by a separation distance that is between 20 and 1000 nm.

5. The apparatus of claim 1 wherein the anode and suppressor are separated by a separation distance that is between 1000 and 10,000 nm.

6. The apparatus of claim 1 wherein the cathode and suppressor are separated by a separation distance that is between 1 and 10 nm.

7. The apparatus of claim 1 wherein the cathode and suppressor are separated by a separation distance that is between 10 and 20 nm.

8. The apparatus of claim 1 wherein the cathode and suppressor are separated by a separation distance that is between 20 and 1000 nm.

9. The apparatus of claim 1 wherein the cathode and suppressor are separated by a separation distance that is between 1000 and 10,000 nm.

10. An apparatus, comprising:
a substrate; and
a pattern on the substrate, wherein the pattern forms:
a cathode;
an anode, wherein the anode and cathode are receptive to a first power source to produce an anode electric potential higher than a cathode electric potential;
a gate receptive to a second power source to produce a gate electric potential selected to induce emission of a first set of electrons from the cathode; and
a suppressor receptive to a third power source to produce a suppressor electric potential, the suppressor electric potential being selected to provide a force on an electron in a direction pointing towards the suppressor in a region between the suppressor and the anode.

11. The apparatus of claim 10 wherein the pattern includes metal.

12. The apparatus of claim 10 wherein the pattern includes a semiconductor.

13. The apparatus of claim 10 wherein the pattern is substantially in a plane.

14. An apparatus comprising:
a first substrate having a first pattern;
a second substrate having a second pattern; and
wherein the first and second substrates are arranged such that the first and second patterns form:
a cathode;
an anode, wherein the anode and cathode are receptive to a first power source to produce an anode electric potential higher than a cathode electric potential;
a gate receptive to a second power source to produce a gate electric potential selected to induce emission of a first set of electrons from the cathode; and
a suppressor receptive to a third power source to produce a suppressor electric potential, the suppressor electric potential being selected to provide a force on an electron in a direction pointing towards the suppressor in a region between the suppressor and the anode.

15. The apparatus of claim 14 wherein the first pattern includes metal.

16. The apparatus of claim 14 wherein the first pattern includes a semiconductor.

17. The apparatus of claim 14 wherein the second pattern includes metal.

18. The apparatus of claim 14 wherein the second pattern includes a semiconductor.

19. The apparatus of claim 14 wherein the first pattern is substantially in a first plane and wherein the second pattern is substantially in a second plane.

20. The apparatus of claim 14 wherein the first pattern includes the cathode and anode and wherein the second pattern includes the gate and suppressor.

21. The apparatus of claim 14 wherein at least one of the first and second substrates includes an insulator, and wherein the first and second substrates are arranged such that the insulator is between the first and second patterns.

22. An apparatus, comprising:
a cathode;
an anode, wherein the anode and cathode are receptive to a first power source to produce an anode electric potential higher than a cathode electric potential;
a gate, the gate being receptive to a second power source to produce a gate electric potential selected to induce electron emission from the cathode for a first set of electrons having energies above a first threshold energy;
a suppressor, the suppressor being receptive to a third power source to produce a suppressor electric potential selected to induce electron emission from the anode;
a first region including gas located between the cathode and anode;
at least one path traversable for a first portion of the first set of the electrons, extending from the cathode, through the first region, and to the anode; and
wherein at least one of the gate and the suppressor is located outside of the first region.

* * * * *